United States Patent
Erwin et al.

(10) Patent No.: US 6,249,770 B1
(45) Date of Patent: Jun. 19, 2001

(54) METHOD AND SYSTEM OF FINANCIAL SPREADING AND FORECASTING

(75) Inventors: Austin Erwin, Wandsworth Common; Stuart Fotheringham, Ashford; Christian McGuinness, Greenford, all of (GB)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 09/238,307

(22) Filed: Jan. 28, 1999

Related U.S. Application Data

(60) Provisional application No. 60/073,092, filed on Jan. 30, 1998.

(51) Int. Cl.$^7$ .................................................. G06F 17/60
(52) U.S. Cl. ................................................................. 705/10
(58) Field of Search .......................................... 705/10, 36

(56) References Cited

U.S. PATENT DOCUMENTS

| | | | |
|---|---|---|---|
| 5,446,890 | * | 8/1995 | Renslo et al. ......................... 707/104 |
| 5,461,699 | * | 10/1995 | Arbabi et al. ......................... 706/21 |
| 5,799,286 | * | 8/1998 | Morgan et al. ........................ 705/30 |
| 5,802,500 | * | 9/1998 | Ryan et al. ............................ 705/30 |
| 5,918,232 | * | 6/1999 | Pouschine et al. ................... 707/103 |
| 5,960,415 | * | 9/1999 | Williams ................................ 705/30 |

FOREIGN PATENT DOCUMENTS

| | | | |
|---|---|---|---|
| 2 306 713 | | 7/1997 | (GB) .............................. G06F/17/60 |
| WO 96/25717 | | 8/1996 | (WO) ............................. G06F/17/60 |

OTHER PUBLICATIONS

Cortinas, Marty. HPS to remodel Ithink simulator. MacWeek Jul. 7, 1997, v11, n26, p29–30.*
Spreadware app does forecasting. MacWeek Jan. 11, 1993, v7, n2, p14.*
http://spreadware/com/index.html, May 23, 2000.*
Seiter, C. Plan your business future with Forecast Pro. PC World, Jan. 1998, v16, issue 1, p128.*
Webpage: Computer Shopper.com, S. Gilliland, Pro Forma 4: A Business Furtuneteller, Sep. 1997; printed Aug. 18, 1999 (www.zdnet.com).
Spreadsheet Financial Tools at http:/spreadware.com/product.html, Copyright 1996; printed Aug. 18, 1999.
Webpage: Investograph Plus for Windows, Softseek Review No. 6206, Dec. 29, 1996; printed Aug. 18, 1999 (www.zdnet.com).

* cited by examiner

*Primary Examiner*—Robert W. Downs
(74) *Attorney, Agent, or Firm*—George T. Marcou; Kilpatrick Stockton LLP

(57) ABSTRACT

A method and system for financial spreading and forecasting provides a computerized system for automatically spreading and analyzing historical financial statements and generating financial forecasts. The system receives and stores information about a company, forecast parameters, including, for example, inflation adjustments, exchange rates, last historic year, and historical account data for the company, and automatically generates financial forecasts for the company. Information can be imported to the system and exported from the system, for example, over a network.

73 Claims, 34 Drawing Sheets

FORECAST ASSUMPTIONS — 93

| | |
|---|---|
| VALUE | — 95 |
| GROWTH RATE | — 97 |
| MULTIPLE | — 99 |
| PERCENT | — 101 |
| PERCENT OF PREVIOUS YEAR | — 103 |
| NONE | — 105 |

CURRENT — 106
SCENARIO OPTIONS

| | |
|---|---|
| BASE CASE | — 108 |
| MANAGEMENT FORECAST | — 110 |
| CITIBANK UPSIDE | — 112 |
| CITIBANK DOWNSIDE | — 114 |
| OTHER | — 116 |

REPORT FORMULAE — 33

Income Statement

| | | | |
|---|---|---|---|
| I1 | Revenue | Currency | Input |
| I2 | Cost of Goods Sold | Currency | Input |
| I3 | Gross Profit | Currency | I1-I2 |
| I4 | SG&A Expense | Currency | Input |
| I5 | R&D Expense | Currency | Input |
| I6 | Operating Lease (Rental Expense) | Currency | Input |
| I7 | Gain/(Loss) on Foreign Exchange (Operations) | Currency | Input |
| I8 | Depreciation on Tangible Fixed Assets | Currency | Input |
| I9 | Amortization of Goodwill/Intangibles | Currency | Input |
| I10 | Other Operating Non-Cash Charges | Currency | Input |
| I11 | Operating Expenses | Currency | I4+I5+I6+I7+I8+I9+I10 |
| I12 | Other Operating Cash Income | Currency | Input |
| I13 | Other Operating Non-Cash Income | Currency | Input |
| I14 | Operating EBIT | Currency | I3-I11+I12+I13 |
| I15 | Gain on Sale of Assets | Currency | Input |
| I16 | Exceptional Income/(Expense) | Currency | Input |
| I17 | Other Income/(Expense) | Currency | Input |
| I18 | Pre-Tax Earnings from Inv.: Equity | Currency | Input |
| I20 | Interest Expense | Currency | Input |
| I21 | Finance Lease Expense | Currency | Input |
| I22 | Other Fixed Charges | Currency | Input |
| I23 | Interest Income | Currency | Input |
| I24 | Dividends from Investments Cost | Currency | Input |
| I25 | Other Non-Operating Cash Income Currency | Input | |
| I26 | Non-Current R&D | Currency | Input |
| I27 | Other Non-Operating, Non-Cash Income | Currency | Input |
| I28 | Other Non-Operating, Non-Cash Expense | Currency | Input |
| I29 | Gain/(Loss) on Foreign Exchange | Currency | Input |
| I30 | Profit Before Taxes | Currency | I14+I15+I16+I17+I18-I20-I21-I22+I23+I24+I25-I26+I27-I2 |

FIG. 5

REPORT FORMULAE — 33
(Continued)

Income Statement (Continued) — 16

| | | | |
|---|---|---|---|
| I31 | Allocations to Untaxed Capital Revenues | Currency | Input |
| I32 | Tax Provision (Exc. NOL) | Currency | Input |
| I33 | Tax on Equity Investments | Currency | Input |
| I34 | Tax Refund | Currency | Input |
| I35 | Current Tax Provision | Currency | I32+I33-I34 |
| I36 | Deferred Tax Provision | Currency | Input |
| I37 | Income Tax | Currency | I35+I36 |
| I38 | Profit After Tax | Currency | I30-I31-I37 |
| I39 | Extraordinary Income/(Expense) | Currency | Input |
| I40 | Income from Discontinued Ops and Other | Currency | Input |
| I41 | Minority Interest | Currency | Input |
| I42 | Net Income | Currency | I38+I39+I40-I41 |
| I43 | Preferred Dividends | Currency | Input |
| I44 | Income Available to Common Stock | Currency | I42-I43 |
| I45 | Common Dividends | Currency | Input |
| I46 | Retained Profit | Currency | I44-I45 |
| I47 | Contingent Rental Payments | Currency | Input |
| I48 | Capitalized Interest | Currency | Input |
| I49 | Dividends from Equity Investments | Currency | Input |
| I50 | Non-Cash Interest Expense (PIK) | Currency | Input |
| I51 | Common Stock: Year End | Count | Input |
| I52 | Common Stock: Weighted Average | Count | Input |
| I53 | Common Stock: Equivalents | Count | Input |
| I54 | Potentially Diluted Securities | Currency | Input |
| I55 | Primary Adjustment to Net Income | Currency | Input |
| I56 | Fully Diluted Adjustment to Net Income | Currency | Input |
| I57 | Fiscal Year Closing Share Price | Price | Input |
| I58 | Capitalized Portion of R&D | Currency | Input |
| I59 | Cash Dividend Reconciliation | Currency | Input |

FIG. 5 (CONTINUED)

REPORT FORMULAE — 33

/ 18

Balance Sheet
B0 Balance Sheet Check (+/−)    Check    B23-B59

Assets
| | | | |
|---|---|---|---|
| B1 | Cash and Cash Equivalents | Currency | Input |
| B2 | Financial Investments/Marketable Securities | Currency | Input |
| B3 | Trade Accounts Receivable | Currency | Input |
| B4 | Accounts Receivable - Off B/S | Currency | Input |
| B5 | Allowance for Doubtful Accounts | Currency | Input |
| B74 | Net Inventories | Currency | Input |
| B7 | Interest Bearing Notes | Currency | Input |
| B8 | Prepaid Expenses | Currency | Input |
| B9 | Current Deferred Tax Asset | Currency | Input |
| B10 | Other Current Assets: Operating | Currency | Input |
| B11 | Intercompany Current Assets | Currency | Input |
| B12 | Other Current Assets: Non-Operating | Currency | Input |
| B13 | Total Current Assets | Currency | B1+B2+B3+B4-B5+B74+B7+B8+B9+B10+B11+B12 |
| B14 | Net Property, Plant and Equipment | Currency | B68-B69 |
| B15 | Capital Value of Finance Leases | Currency | Input |
| B16 | Deferred Tax Assets | Currency | Input |
| B17 | Investments: Subsidiaries and Affiliates | Currency | Input |
| B18 | Other Investments | Currency | Input |
| B19 | Goodwill/Intangibles | Currency | Input |
| B20 | Other Non-Current Assets: Operating | Currency | Input |
| B21 | Other Non-Current Assets: Non-Operating | Currency | Input |
| B22 | Total Non-Current Assets | Currency | B14+B15+B16+B17+B18+B19+B20+B21 |
| B23 | Total Assets | Currency | B13+B22 |

Liabilities
| | | | |
|---|---|---|---|
| B24 | Trade Accounts Payable | Currency | Input |
| B25 | Accruals | Currency | Input |
| B26 | Taxes Payable | Currency | Input |

FIG. 6

REPORT FORMULAE — 33
(Continued)

Balance Sheet (Continued)
Liabilities (Continued)

| | | | |
|---|---|---|---|
| B27 | Current Deferred Tax Liabilities | Currency | Input |
| B75 | Advances received | Currency | Input |
| B28 | Other Current Operating Liabilities | Currency | Input |
| B29 | Intercompany Current Liabilities | Currency | Input |
| B30 | Interest Payable | Currency | Input |
| B31 | Dividends Payable | Currency | Input |
| B32 | Reported Short Term Borrowings | Currency | Input |
| B33 | Off B/S Short Term Borrowings | Currency | Input |
| B34 | Current Maturities - LTD | Currency | Input |
| B72 | Other Non-Operating Current Liabilities | Currency | Input |
| B35 | Total Current Liabilities | Currency | B24+B25+B26+B27+B28+B29+B30+B31+B32+B33+B34 |
| B36 | Finance Lease Obligations | Currency | Input |
| B37 | Senior Long Term Debt | Currency | Input |
| B38 | Subordinate Long Term Debt | Currency | Input |
| B39 | Long Term Debt Excess | Currency | Input |
| B40 | Total Long Term Debt | Currency | B36+B37+B38+B39 |
| B41 | Deferred Tax Liability | Currency | Input |
| B42 | LT Provisions | Currency | Input |
| B76 | Pension provisions | Currency | Input |
| B43 | Untaxed Reserves: Non-Equity | Currency | Input |
| B44 | Other Long Term Liabilities: Operating | Currency | Input |
| B45 | Other Long Term Liabilities: Non-Operating | Currency | Input |
| B46 | Total Liabilities | Currency | B35+B40+B41+B42+B76+B43+B44+B45 |
| B47 | Minority Interest | Currency | Input |
| B48 | Untaxed Reserves: Equity | Currency | Input |
| B49 | Preferred Stock | Currency | Input |
| B50 | Common Stock | Currency | Input |

FIG. 6 (Continued)

REPORT FORMULAE — 33
(Continued)

Balance Sheet (Continued)
Liabilities (Continued)

| | | | |
|---|---|---|---|
| B51 | Additional Paid-in Capital | Currency | Input |
| B52 | Non-Distributable Capital Reserves | Currency | Input |
| B53 | Distributable Capital Reserves | Currency | Input |
| B54 | Revaluation Reserve | Currency | Input |
| B55 | Other Reserves | Currency | Input |
| B77 | Goodwill reserve | Currency | Input |
| B56 | Retained Earnings | Currency | Input |
| B57 | Less Treasury Stock | Currency | Input |
| B58 | Total Net Worth | Currency | B47+B58+B49+B50+B51+B52+B53+B54+B55+B56+B57 |
| B59 | Total Liabilities and Equity | Currency | B46+B58 |
| B60 | Tangible Net Worth | Currency | B58-B19 |
| B61 | Contingent Liabilities | Currency | Input |
| B62 | Pledged Assets | Currency | Input |
| B63 | Fixed Capital Investment | Currency | Input |
| B64 | Depreciation of Tangible Fixed Assets | Currency | Input |
| B65 | Amortization of Intangible Fixed Assets | Currency | Input |
| B68 | Gross Property, Plant and Equipment | Currency | Input |
| B69 | Accumulated Depreciation | Currency | Input |
| B70 | Adjustment to Funds Flow: Sources | Currency | d(B56)-I46 |

FIG. 6 (Continued)

REPORT FORMULAE — 33

Input Cash Flow

| | | | |
|---|---|---|---|
| CA1 | Operating EBIT | Currency | I14 |
| CA2 | Depreciation and Amortization | Currency | IF(B64<>0,B64+B65,B64+I19),IF(B65<>0,I8+B65,I8+I9)) |
| CA3 | Operating EBITDA | Currency | CA1+CA2 |
| CA4 | Gross Rental Expense | Currency | I6+I47 |
| CA5 | Operating EBITDAR | Currency | CA3+CA4 |
| CA6 | Gross Rental Expense | Currency | -CA4 |
| CA7 | Gross Interest Expense | Currency | -(I20+I48) |
| CA8 | Inc. Taxes Less Change in Def. Taxes | Currency | Input |
| CA9 | Other Operating Non-Cash Items | Currency | Input |
| CA10 | Change in Working Capital | Currency | Input |
| CA11 | Net Cash from Operations | Currency | CA5+CA6+CA7+CA8+CA9+CA10 |
| CA12 | Less Capital Expenditures | Currency | Input |
| CA13 | Plus Capitalized Interest | Currency | I48 |
| CA15 | Less Capitalized R&D Expenses | Currency | -I58 |
| CA16 | Less Acquisitions (Exc. Funding) | Currency | Input |
| CA17 | Plus Divestitures (Exc. Funding) | Currency | Input |
| CA18 | Plus Asset Disposals | Currency | Input |
| CA19 | Plus Income from Investments | Currency | Input |
| CA20 | Less Change in Financial Investments | Currency | Input |
| CA21 | Plus Increase in Intercompany Funding | Currency | Input |
| CA22 | Less Other Financing Charges | Currency | Input |
| CA23 | Plus Other Non-Operating Cash Items | Currency | Input |
| CA24 | Free Cash Flow | Currency | CA11+CA12+CA13+CA15-CA16+CA17+CA18+CA19+CA20+CA21+CA22+CA23 |
| CA25 | Less Scheduled Debt Repayment | Currency | Input |
| CA26 | Less Preferred Dividends | Currency | Input |
| CA27 | Less Common Dividends | Currency | Input |
| CA28 | Net Capital Excess (Need) | Currency | CA24+CA25+CA26+CA27 |
| CA29 | Additional Debt Issued (Retired) | Currency | Input |
| CA30 | Equity Issued (Retired) | Currency | Input |
| CA31 | Changes in Cash Balances | Currency | CA28+CA29+CA30 |
| CA32 | Cash and Marketable Securities at Yr End | Currency | Input |

FIG. 7

REPORT FORMULAE — 33

Calculated Cash Flow

| | | | |
|---|---|---|---|
| CC1 | Operating EBIT | Currency | I14 |
| CC2 | plus Depreciation Expense | Currency | IF B64<>0 THEN B64 ELSE I8 |
| CC3 | plus Amort of Goodwill/Intangibles | Currency | IF B65<>0 THEN B65 ELSE I9 |
| CC5 | Operating EBITDA | Currency | CC1+CC2+CC3 |
| CC6 | plus Gross Rental Expense | Currency | I6+I47 |
| CC7 | Operating EBITDAR | Currency | CC5+CC6 |
| CC8 | less Gross Rental Expense | Currency | I6+I47 |
| CC4 | plus Other Non-Cash Items | Currency | I10=I13 |
| CC48 | Gross Operating Funds Generation | Currency | CC7=CC8+CC4 |

Current Working Capital Accounts: (Use)/Source

| | | | |
|---|---|---|---|
| CC9 | Change in Accounts Receivable | Currency | -(d(B3)+d(B4)) |
| CC10 | Change in Inventory | Currency | -(d(B74)) |
| CC11 | Change in Prepaid Expenses | Currency | -(d(B8)) |
| CC12 | Change in Other Current Assets | Currency | -(d(B10)) |
| CC13 | Change in Accounts Payable | Currency | d(B24) |
| CC47 | Change in Advances Received | Currency | d(B75) |
| CC14 | Change in Accruals | Currency | d(B25) |
| CC15 | Change in Other Curr Liabs | Currency | d(B28) |
| CC16 | Net Change in Working Capital | Currency | CC9+CC10+CC11+CC12+CC13+CC47+CC14+CC15 |
| CC17 | Income Taxes Paid | Currency | -(I37-I33-d(B26)-d(B27)-d(B41)+d(B9)+d(B16)) |
| CC18 | Capital Expenditures | Currency | -(I20-I48-d(B30)-I50) |
| CC19 | Capitalized R&D | Currency | -B63 |
| CC20 | Capitalized Interest | Currency | -I58 |
| CC21 | Incr in LT Working Investment | Currency | -I48 |
| CC22 | Operating Cash Flow | Currency | d(B44)-d(B20) |
| CC23 | Cash Interest Paid | Currency | CC48+CC16+CC17+CC18+CC19+CC20+CC21 |
| CC24 | Repay of ST Debt | Currency | If ((d(B32)+d(B33))>0, 0, d(B32)+d(B33)) |
| CC25 | Repay of LT Debt | Currency | If ((d(B37)+d(B38)+d(B36)+d(B39)+B34+I29)>0, -(lag(B34)), (d(B37)+d(B38)+d(B36)+d(B39)+d(B34))) +I29-lag(B34))) |

FIG. 8

REPORT FORMULAE — 33 (Continued)

Calculated Cash Flow (Continued)
Current Working Capital Accounts: (Use)/Source (Continued)

| | | | |
|---|---|---|---|
| CC26 | Repay of Prin & Reduction of Fin Lease Oblig | Currency | CC24+CC25 |
| CC27 | Other Financing Charges | Currency | −(I21+I22) |
| CC28 | Net Oper Cash after Debt Ser | Currency | C22+C23+CC26+CC27 |

Non-Operating Sources

| | | | |
|---|---|---|---|
| CC29 | Issuance of Equity | Currency | d(B50)+d(B51)+d(B49)−D(B57) |
| CC30 | Asset Disposals | Currency | lag(B68)+B63−lag(B69)−B64+B69+I15+d(B54)−B68 |
| CC31 | Incr in ST Debt | Currency | If (d(B32)+d(B33)>0, (d(B32)+d(B33)),0) |
| CC32 | Incr in LT Debt | Currency | If ((d(B37)+d(B38)+d(B36)+d(B39)+B34+I29)>0, (d(B37)+d(B38)+d(B36)+d(B39)+(B34)+I29),0) |
| CC33 | Incr in ST and LT Debt | Currency | CC31+CC32 |
| CC34 | Other Non-Operating Sources | Currency | I13−I10+I16+I17+I25+I27−I28−I31+I40−I41+I49−d(B7)+ d(B5)−d(B12)−d(B15)−d(B19))−d(B21)+d(B72)+ d(B42)+d(B43)+d(B45)+d(B47)+d(B48)+d(B52)+ d(B53)+d |
| CC46 | Equity Adjustments | Currency | B70 |
| CC35 | Interest Income | Currency | I23 |
| CC36 | Dividends from Invests: Cost | Currency | I24 |
| CC37 | Incr in Intercompany Funding | Currency | d(B29)−d(B11) |
| CC39 | Extraordinary Income/Expense | Currency | I39 |

Non-Operating Uses

| | | | |
|---|---|---|---|
| CC40 | Increase in Invests in Subsidiaries & Affiliates | Currency | −(d(B17))−I18+I33+I49) |
| CC41 | Incr in Other Investments | Currency | −(B18−lag(B18)) |
| CC42 | Cash & Marketable Secs Avail to | Currency | CC28+CC29+CC30+CC33+CC34+CC46+CC35+ CC36+CC37+CC39+CC40+CC41 |

FIG. 8 (Continued)

REPORT FORMULAE — 33
(Continued)

Non-Operating Uses (Continued)

| | | | |
|---|---|---|---|
| CC43 | Dividends Paid | Currency | I43+I45−d(B31) |
| CC44 | Change in Total Cash | Currency | CC42+CC43 |
| CC49 | Change in Marketable Securities | Currency | d(B2) |
| CC50 | Change in Cash and Cash Equivalents | Currency | d(B1) |
| CC45 | Change in Cash & Marketable Securities | Currency | d(B1)+d(B2) |

FIG. 8 (Continued)

REPORT FORMULAE — 33

Ratios
Liquidity/Activity Ratios

| | | | |
|---|---|---|---|
| R1 | Current Ratio (X) | Ratio | B13/B35 |
| R2 | Quick Asset Ratio (X) | Ratio | (B1+B2+B3+B5)/B35 |
| R3 | Days Receiavable (Avg) | Count | (@priorB3+B3+@priorB4+B4+@priorB5+B5)/2/I1*365 |
| R4 | Days Receivable (Yr on Yr) | Count | ((B3+B4+B5)/I1)*365 |
| R5 | Days Inventory (Avg) | Count | (@priorB74+B74)/2/I2*365 |
| R6 | Days Inventory (Yr on Yr) | Count | (B74/I2)*365 |
| R7 | Days Payable (Avg) | Count | (@priorB24+B24)/2/I2*365 |
| R8 | Days Payable (Yr on Yr) | Count | (B24/I2)*365 |
| R9 | Days Working Capital Investment (Avg) | Count | @priorB3+B3+@priorB4+B4+@priorB5+B5+@priorB74+B74+@priorB8+B8+@priorB10+B10-@priorB24-B24-@priorB25-B25-@priorB75-@priorB75-@priorB28-B28)/2/I1*365 |
| R10 | Days Working Capital Investment (Yr on Yr) | Count | (B3+B4+B5+B74+B8+B10-B24-B25-B75-B28)/I1*365 |

REPORT FORMULAE — 33

Performance Ratios

| | | | |
|---|---|---|---|
| R11 | Asset Turnover (X) | Ratio | I1/(((@priorB23-@priorB19-@priorB17-@priorB2+B23-B19-B17-B2)/2) |
| R12 | Net Fixed Asset Turnover (X) | Ratio | I1/(((@priorB14+B14)/2) |

Key Operating Ratios

| | | | |
|---|---|---|---|
| R13 | Gross Profit Margin (%) | Percent | I3/I1*100 |
| R14 | Total Revenue Growth (%) | Percent | ((I1-lag(I1))/lag(I1))*100 |
| R15 | COGS as Pct. Total Revenue (%) | Percent | I2/I1*100 |
| R16 | S,G&A as Pct. Total Revenue (%) | Percent | I4/I1*100 |
| R17 | R&D as Pct. Total Revenue (%) | Percent | (I5+I26)/I1*100 |
| R18 | Operating EBIT as Pct. Total Revenue (%) | Percent | I14/I1*100 |
| R19 | Operating EBITDAR as Pct. Total Revenue (%) | Percent | CA5/I1*100 or CC7/I1*100 |
| R20 | Change in Working Cap. as Pct. Tot Revenue (%) | Percent | CA10/I1*100 or CC16/I1*100 |
| R21 | Operating Cash Flow as Pct. Tot Revenue (%) | Percent | CA11/I1*100 or CC22/I1*100 |
| R22 | Capital Expenditures as Pct. Tot Revenue (%) | Percent | -CA12/I1*100 or -CC18/I1*100 |

FIG. 10

REPORT FORMULAE — 33

Key Financial Ratios

| | | | |
|---|---|---|---|
| R23 | Operating EBIT/Gross Interest (X) | Ratio | I14/(I20+I48) |
| R24 | Operating EBITDA/Gross Interest (X) | Ratio | CA3/(I20+I48) or CC5/(I20+I48) |
| R25 | Op. EBITDAR/Gr. Interest plus 1/3 Gr. Rent. (X) | Ratio | CA5/(I20+I48+((I6+I47)/3)) or CC7/(I20+I48+((I6+I47)/3)) |
| R26 | Fixed-Charges Coverage | Ratio | (CA5+CA12+CA10)/(CA7+CA6+CA26+CA25) or (CC5+CC18+CC16)/(CC23+CC26) |
| R27 | Free Cash Flow Coverage | Ratio | (CA3+CA8+CA10+CA12+CA7+CA26+CA27)/(I43+I45+I20+I48) or (CC5+CC17+CC16+CC18+CC23+CC43)/(I43+I45+I20+I48) |
| R28 | Total Debt/Total Book Capital (%) | Ratio | (B32+B33+B34+B40)/(B47+B48+B49+B50+B51+B52+B53+B54+B55+B77+B56-B57+B40+B32+B33+B34)*100 |
| R29 | Pref. Stock/Total Book Capital (%) | Ratio | (B49)/(B47+B48+B49+B50+B51+B52+B53+B54+B55+B77+B56-B57+B40+B32+B33+B34)*100 |
| R30 | Common Equity/Total Book Capital | Ratio | (B47+B48+B50+B51+B52+B53+B54+B55+B77+B56-B57)/(B47+B48+B49+B50+B51+B52+B53+B54+B55+B77+B56-B57+B40+B32+B33+B34) |
| R31 | Tot Debt (with Rents)/Tot Cap. (with Rents) (%) | Ratio | ((B32+B33+B34+B40+(8*(I6+I47))/((8*(I6+I47))+B47+B48+B49+B50+B51+B52+B53+B54+B55+B77+B56-B57+B40+B32+B33+B34))*100 |
| R32 | Total Debt/Operating EBITDA (X) | Ratio | (B32+B33+B34+B40)/(CA3) or (B32+B33+B34+B40)/(CC5) |
| R33 | Cash Interest Coverage 1 | Ratio | (CA11+CA12=CA13+CA15)/(-CA7) or CC22/(-CC23) |
| R34 | Cash Interest Coverage 2 | Ratio | (CA11/I20) or (CC22-CC20-CC19-CC18)/I20 |
| R35 | Total Liabilities/Tangible Net Worth | Ratio | B46/B60 |
| R36 | Total Liabilities/Net Worth | Ratio | B46/B58 |

FIG. 11

REPORT FORMULAE — 33

Historical Trend Analysis

| | | | |
|---|---|---|---|
| R37 | Reported Revenue | Currency | I1 |
| R38 | Reported EBIT | Currency | I30+I20 |
| R39 | Reported Net Income | Currency | I42 |
| R40 | Common Dividend per Share | Price | I45/I52 |
| R41 | Dividend Payout Ratio | Ratio | I45/I44*100 |
| R42 | Common Shares Outstanding, Primary | Count | I52+I53 |
| R43 | Primary Earnings per Share | Price | (R28+I55)/(I52+I53) |
| R44 | Fully Diluted Earnings per Share | Price | (R28+I56)/(I52+I54) |

FIG. 12

REPORT FORMULAE — 33

Additional Ratio Analysis

| | | | |
|---|---|---|---|
| R45 | Operating EBIT/Net Adjusted Interest Expense | Ratio | I14/(I20+I48-I23) |
| R46 | Net Total Debt/Net Total Book Capital (%) | Ratio | (B32+B33+B34+B40-B1-B2)/(B47+B48+B49+B50+B51+ B52+B53+B54+B55+B77+B56-B57+B40+B32+B33+B34 -B1-B2)*100 |
| R47 | Total Debt/Total S&P Capital (%) | Ratio | (B32+B33+B34+B40)/(B32+B33+B34+B40+B41+B47+B48 +B49+B50+B51+B52+B53+B54+B55+B77+B56-B57+ B27)*100 |
| R48 | Total Debt/Total Market Capital | Ratio | (B32+B34+B33+B40)/(B32+B33+B34+B40+B49+(I51*I57)) |
| R49 | Effective Tax Rate (%) | Percent | I37/I30*100 |

FIG. 13

REPORT FORMULAE — 33

Executive Summary
Summarized Income Statement

| | | | |
|---|---|---|---|
| X1 | Revenue | Currency | X1 |
| X4 | COGS | Currency | I2 |
| X5 | SG&A Expense | Currency | I4 |
| X6 | R&D Expense | Currency | I5 |
| X7 | Depreciation & Amortization | Currency | I8+I9 |
| X8 | Other Operating Expense/(Income) | Currency | I6+I10+I7-I12-I13 |
| X9 | Total Operating Expenses | Currency | X4+X5+X6+X7+X8 |
| X10 | Operating EBIT | Currency | X1-X9 |
| X11 | Interest Expense | Currency | I20 |
| X12 | Income Taxes | Currency | I37 |
| X13 | Other Non-Operating Profit | Currency | I15+I16+I17+I18-I21+I22+I23+I24+I25-I26-I27-I28-I29-I31+I39+I40 |
| X14 | Net Income | Currency | I42 |
| X64 | Minority Interest | Currency | I41 |
| X15 | Preferred Dividends | Currency | I43 |
| X16 | Income Available to Common Stock | Currency | X14-X15-X64 |

Summarized Balance Sheet: Assets

| | | | |
|---|---|---|---|
| X17 | Cash and Cash Equivalents | Currency | B1 |
| X18 | Financial Investments | Currency | B2 |
| X19 | Net Accounts Receivable | Currency | B3-B5 |
| X20 | Net Inventories | Currency | B74 |
| X21 | Other Current Assets | Currency | B7+B8+B9+B10+B11+B12+B4 |
| X22 | Current Assets | Currency | B13 |
| X23 | Net Property, Plant and Equipment | Currency | B14 |
| X24 | Deferred Assets | Currency | B16 |
| X25 | Intangibles | Currency | B19 |

FIG. 14

REPORT FORMULAE — 33
(Continued)

Summarized Balance Sheet: Assets (Continued)

| | | | |
|---|---|---|---|
| X26 | Other Assets | Currency | B15+B17+B18+B20+B21 |
| X27 | Total Assets | Currency | B23 |

Summarized Balance Sheet: Liabilities

| | | | |
|---|---|---|---|
| X28 | Accounts Payable and Accruals | Currency | B24+B25 |
| X29 | Taxes Payable | Currency | B26 |
| X30 | Other Liabilities | Currency | B27+B28+B29+B30+B31+B72+B75 |
| X31 | Short Term Borrowings | Currency | B32+B33 |
| X32 | Current Maturities | Currency | B34 |
| X33 | Current Liabilities | Currency | B35 |
| X34 | Long Term Debt | Currency | B40 |
| X35 | Other Long Term Liabilities | Currency | B41+B42+B43+B44+B45+B76 |
| X36 | Pref. Stock | Currency | B49 |
| X37 | Common Equity | Currency | B50+B51 |
| X38 | Total Liabilities and Equity | Currency | B59 |

Key Operating Ratios

| | | | |
|---|---|---|---|
| X39 | Total Revenue Growth (%) | Percent | R14 |
| X40 | COGS as Pct. Total Revenue (%) | Percent | R15 |
| X41 | S,G&A as Pct. Total Revenue (%) | Percent | R16 |
| X42 | R&D as Pct. Total Revenue (%) | Percent | R17 |
| X43 | Operating EBIT as Pct. Total Revenue (%) | Percent | R18 |
| X44 | Operating EBITDAR as Pct. Total Revenue (%) | Percent | R19 |
| X45 | Change in Working Cap. as Pct. Tot Revenue (%) | Percent | R20 |
| X46 | Operating Cash Flow as Pct. Tot Revenue (%) | Percent | R21 |
| X47 | Capital Expenditures as Pct. Tot Revenue (%) | Percent | R22 |

FIG. 14 (Continued)

REPORT FORMULAE — 33
(Continued)

Key Financial Ratios
| | | | |
|---|---|---|---|
| X48 | Operating EBIT/Gross Interest (X) | Ratio | R23 |
| X49 | Operating EBITDA/Gross Interest (X) | Ratio | R24 |
| X50 | Op. EBITDAR/Gr. Interest plus 1/3 Gr. Rent. (X) | Ratio | R25 |
| X51 | Fixed-Charges Coverage | Ratio | R26 |
| X52 | Free Cash Flow Coverage | Currency | R27 |
| X53 | Total Debt/Total Book Capital (%) | Ratio | R28 |
| X54 | Pref. Stock/Total Book Capital (%) | Ratio | R29 |
| X55 | Common Equity/Total Book Capital | Ratio | R30 |
| X56 | Tot Debt (with Rents)/Total Cap. (with Rents) (%) | Ratio | R31 |
| X57 | Total Debt/Operating EBITDA (X) | Ratio | R32 |

Capitalization
| | | | |
|---|---|---|---|
| X58 | Total Debt | Currency | B32+B33+B34+B40 |
| X59 | Eight Times Gross Rental Expense | Currency | 8*(I6+I47) |
| X60 | Total Debt (with Rents) | Currency | X58+X59 |
| X61 | Preferred Stock | Currency | B49 |
| X62 | Common Equity | Currency | B47+B48+B50+B51+B52+B53+B54+B55+B77+B56-B57 |
| X63 | Total Capital (with Rents) | Currency | X60+X61+X62 |

**REPORT FORMAT — 76
CURRENCY**

| INPUT CURRENCY | EXCHANGE CURRENCY | U.S. DOLLARS | NOMINAL OR REAL |
|---|---|---|---|
| 109 | 111 | 113 | 115 |

FIG. 20

THE YEAR LEVEL VARIABLES REPORT

Year Level Variables: ——— 98

100 ——— YL1   Statement date
102 ——— YL2   Accounting status

Domestic Inflation Rate

YL3   Domestic inflation rate (%)
YL4   Domestic inflation index rate

Inflation Adjustment

YL5   Inflation rate [inflation adjustment] (%)
YL6   Inflation rate index [inflation adjustment]

Input Format Exchange Currency

YL7   ARGENTINE PESO per POUND STERLING xrate
YL8   UNITED KINGDOM inflation rate (%)
YL9   Macro devaluation (%)

U.S. Dollars

YL10   ARGENTINE PESO per US DOLLAR xrate
YL11   UNITED STATES inflation rate (%)
YL12   Macro devaluation (%)

FIG. 21

| | | | |
|---|---|---|---|
| | | | Base Case |

57  59  61       55

| ☐ Company: 0000001111 ASL | | | |
|---|---|---|---|
| Settings | 11. Input (Currency) | | |
| Company Information | Definition: This revenue account refers to gross sales, revenues on turnover allowances, and sales related taxes. Revenues and income from discontin | | Income |
| Parameters | | ? O X | |
| Reports/Inputs | Apply | | |
| Income Statement % | Individual accounts in this report | | |
| Balance Sheet % | 11. Revenue | | |
| Cash Flow | 12. Cost of Goods Sold | | |
| Other Data | 12.1. Sub account to main account 12 | | |
| Citibank Funds | 12.2. Sub account to main account 12 | | |
| GRANS Cash Flow | 14. SG&A Expense | | |
| Executive Summary | | | |
| Report Format | Input forecast figures | | |
| Standard | | | |
| $ Exchange Rate | Input your own assumptions ___158 | | |
| = Constant Real | ○ Value ___160 | | |
| Report View | ○ Growth rate ___162 | | |
| Standard ☐ ☐ | ○ Multiple ___164 | | |
| Toolkit | ○ Percent ___166 | | |
| Forecasting | ○ Percent of previous year ___168 | | |
| Inflation Accounting | ○ None ___170 | | |
| Sub Accounts | Input data for this account | | |
| Extras | | | |

FIG. 22

FORECAST ASSUMPTIONS — 93

| | | | | | |
|---|---|---|---|---|---|
| VALUE | GROWTH RATE | MULTIPLE | PERCENT | PERCENT OF PREVIOUS YEAR | NONE |
| 95 | 97 | 99 | 101 | 103 | 105 |

FIG. 23

AUTO INPUT FIGURES — 118
FOR GROWTH RATE ASSUMPTIONS

| | |
|---|---|
| GROWTH RATE OF PREVIOUS YEAR | 120 |
| AVERAGE GROWTH RATE OF HISTORIC YEARS | 122 |
| COMPOUND ANNUAL GROWTH RATE OF HISTORIC YEARS | 124 |
| MOVING AVERAGE GROWTH RATE OF 3-5 YEARS | 126 |
| MOVING COMPOUND ANNUAL GROWTH RATE OF 3-5 YEARS | 128 |

FIG. 25

CALCULATED FORECAST — 117
ASSUMPTIONS AND FIGURES

| |
|---|
| GROWTH RATE OF PREVIOUS YEAR — 119 |
| AVERAGE GROWTH RATE OF HISTORIC YEARS — 121 |
| COMPOUND ANNUAL GROWTH RATE OF HISTORIC YEARS — 123 |
| MOVING AVERAGE GROWTH RATE OF 3-5 YEARS — 125 |
| MOVING COMPOUND ANNUAL GROWTH RATE OF 3-5 YEARS — 127 |

FIG. 26

METHOD AND SYSTEM OF FINANCIAL SPREADING AND FORECASTING

CROSS-REFERENCE TO RELATED APPLICATIONS

This application claims the benefit of U.S. Provisional Application Ser. No. 60/073,092 filed Jan. 30, 1998.

FIELD OF THE INVENTION

The present invention relates generally to computerized financial spreading and forecasting and more particularly to a computerized method and system for manipulating historic accounting data and producing financial spreads and forecasts.

BACKGROUND OF THE INVENTION

The process of determining the operating profitability and cash flow-generating ability of a company's operations requires a great deal of expertise. The existing approach to the process typically consists of a number of primarily manually-driven steps. Present manual methods for determining the profitability and cash flow-generating ability of a company is very inefficient and time consuming. There is a current need for a computerized method and system of automatically highlighting the operating profitability and cash flow-generating ability of a company's operations in a structured and standardized way utilizing a computer program capable of manipulating historic accounting data and producing spreads and forecasts.

SUMMARY OF THE INVENTION

It is a feature and advantage of the present invention to provide a computerized method and system of financial spreading and forecasting which highlights the operating profitability and cash flow-generating ability of a company's operations.

It is a further feature and advantage of the present invention to provide a structured and standardized way of highlighting the operating profitability of a company utilizing a user-friendly and intuitive computer program capable of manipulating historic accounting data and producing spreads and forecasts.

It is another feature and advantage of the present invention to provide an emerging markets global risk analysis method and system which enables emerging markets users to automatically spread and analyze historical financial statements and to do financial forecasting.

It is an additional feature and advantage of the present invention to provide a computerized method and system for financial spreading and forecasting for use by a financial institution, such as a bank, which allows global data transferability across the global corporate bank It is a still further feature and advantage of the present invention to provide a computerized method and system for financial spreading and forecasting which presents a standard format when users sign up initially.

It is still another feature and advantage of the present invention to provide a computerized method and system for financial spreading and forecasting which enables a user, such as a business, to make format modifications.

It is another feature and advantage of the present invention to provide a computerized method and system for financial spreading and forecasting in which the modified format is saved to become the standard spread sheet for the business.

It is an additional feature and advantage of the present invention provide a computerized method and system for financial spreading and forecasting which eliminates the need for reprogramming such modification repeatedly.

To achieve the stated and other features, advantages and objects of the present invention, an embodiment of the invention provides a method and system for performing financial spreads and forecasts for an entity, such as a company, utilizing an application program running on a computer, such as a personal computer. The system according to an embodiment of the present invention provides, for example, risk managers, analysts and approvers with a standardized financial analysis, spreading and forecasting tool. The system uses a basic accounting template, so that information can be easily transferred and used throughout a financial institution, and the template can be modified to reflect local accounting practice. Accounts can easily be added to or removed from the basic template. Ratios can be accurately added to present industry or geography characteristics. Using a customization function, businesses can create their own template and reports to present financial information exactly as they wish, without losing the ability to easily transfer the data in usable form throughout the financial institution.

In an embodiment of the present invention, financial statements can be created for economic groups by combining financials of companies within the group. The performance of an individual company can be compared against the performance of an industry or against any other combination of companies. By aggregating or averaging groups of companies, the system can be used to support stress testing. The system also allows users to compare actual performance of a company or group of companies against forecast performance from an analysis done in the previous year. Financial information can be presented in a common sized format and in any currency to facilitate comparisons. To minimize data loading, the system accepts automated downloading from several existing financial institution data sources and systems. Data bridges maximize the ease of inputting data into various debt rating models.

In an embodiment of the present invention, the system receives information about the entity, forecast parameters for the entity, historical account data for the entity, and automatically generates a financial forecast for the entity, based at least in part on the forecast parameters and the historical account data. The information about the entity that is received by the system consists, for example, of a Company ID which uniquely identifies the entity. The entity information received by the system also, includes, for example, the name of the entity and the industry classification for the entity. The information is entered on the system by the user at the computer in response to an automatic prompt for the information by the system. The system automatically displays a company information panel, and the user enters the information about the entity on the company information panel. The forecast parameters for the entity that are received by the system include, for example, last historic year parameters and inflation adjustment parameters. The forecast parameters are likewise entered in the system by the user at the computer in response to an automatic prompt. The system automatically displays a parameters panel, and the user enters the forecast parameters on the forecast parameters panel.

In an embodiment of the present invention, the historical account data for the entity is gathered by the user, for example, by retrieving the data from a database, such as a computer database, storing the data. Alternatively, the historic account data is imported from the database to the system, for example, over a computer network. The historic account data is received by the system, for example, by the user entering the data on one or more input reports of the system, such as an income statement report, a balance sheet report, or an input cash flow report. To facilitate entry of the historic data, the system automatically displays a company window showing the input reports, and the data is entered on the displayed input reports. The system automatically generates one or more calculated reports based at least, in part, on the input data, including, for example, calculated cash flow report, ratios report, and an executive summary report, which the system automatically displays for the user to view.

In an embodiment of the present invention, the system automatically generates a financial forecast for the entity for a pre-determined number of years based at least in part on the historic account data and the forecast parameters. The system automatically forecasts, for example, one or both of all accounts in a current report or individual accounts in a current report. The system also automatically forecasts any one of a number of forecast assumptions, including for example, growth rate of a previous year, growth rate of historic years, compound annual growth rate of historic years, moving average growth rate of a pre-determined number of years, and moving compound annual growth rate of a pre-determined number of years. In generating the financial forecast, the system is also capable of automatically adjusting one or more accounts for inflation and automatically converting currency. Further, the system is capable of automatically generating a custom report or a combined file for an entity. The system automatically displays the financial forecast for the user, and the user assesses the operating profitability and cash flow-generating capabilities of the entity based on the financial forecast. The system is also capable of exporting information to other systems.

In an embodiment of the present invention, the system utilizes an application program running on a computer, such as a personal computer, for receiving the information about the entity, the forecast parameters for the entity, and the historical account data for the entity, as well as for automatically generating the financial forecast for the entity. The historical account data for the entity may be entered in the system by the user at the computer, or the computer may be coupled, for example, to a computer database storing the historical account data. In the latter case, the historic account data is imported directly from the database to the application program, for example, over a computer network, such as the Internet.

Additional objects, advantages and novel features of the invention will be set forth in part in the description which follows, and in part will become more apparent to those skilled in the art upon examination of the following or may be learned by practice of the invention.

BRIEF DESCRIPTION OF THE DRAWINGS

FIGS. 5–14 are tables which illustrate sample Report Formulae for an embodiment of the present invention;

FIG. 17 shows a sample Company Window with the Company Menu for an embodiment of the present invention;

FIG. 20 is a table which shows sample Report Format Currency selections for the graphical user interface for an embodiment of the present invention;

FIG. 21 is a table which shows sample Year Level Variables report selections for the graphical user interface for an embodiment of the present invention;

FIG. 22 is a sample Forecasting panel for an embodiment of the present invention;

FIG. 23 is a table which shows sample Forecast Assumptions selections for the graphical user interface for an embodiment of the present invention;

FIG. 25 is a table which shows sample Auto Input Figures selections for the graphical user interface for an embodiment of the present invention;

FIG. 26 is a table which shows sample Calculated Forecast Assumptions for an embodiment of the present invention;

DETAILED DESCRIPTION

Figure 1:
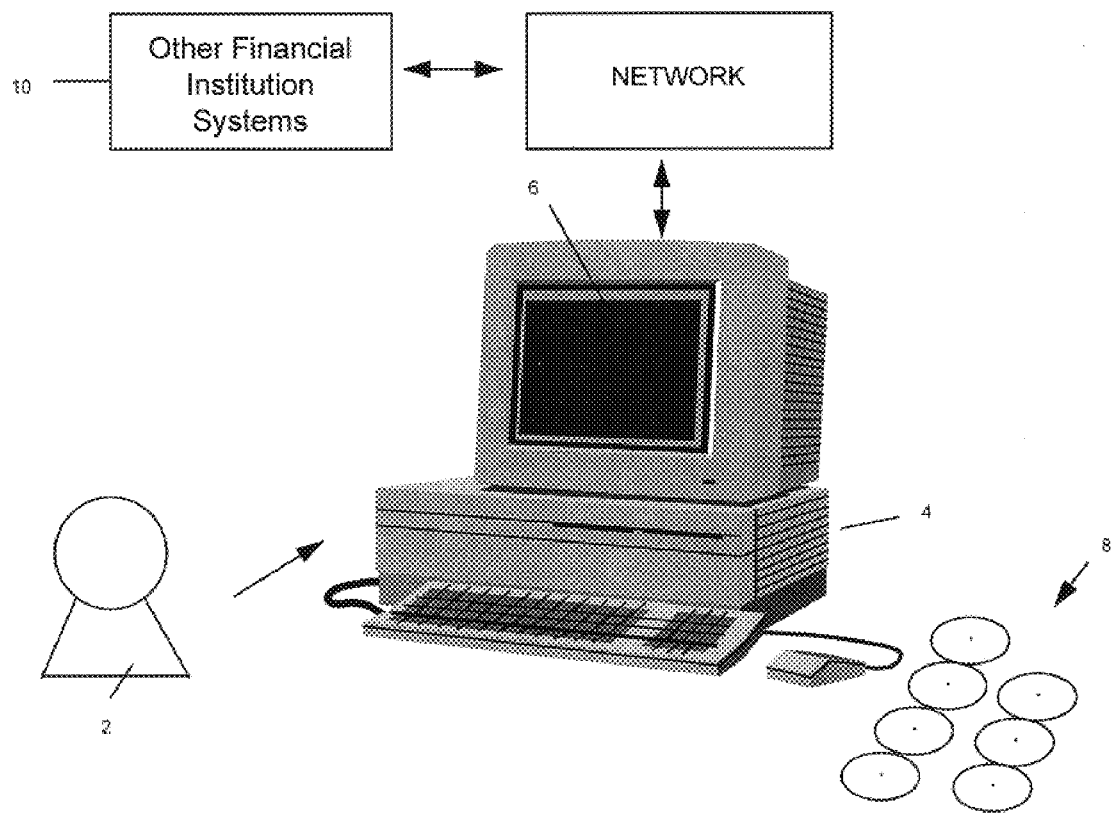
FIG. 1 shows an overview of key components, and the flow of information between the key components, for an embodiment of the present invention.

Referring now to an embodiment of the present inventions, an example of which is illustrated in the accompanying drawings, the method and system for performing financial spreading and forecasting for an embodiment of the present invention includes system software running on a computer, such as a personal computer (PC). FIG. 1 shows an overview of key components for an embodiment of the present invention. The key components include, for example, a user 2 at a PC 4 with a monitor 6, system software on CD's 8. PC 4 can be coupled to other systems 10, for example, of the financial institution over a network 12, such as a local area network or the Internet. Such other systems 10 can include a database storing information, such as historical account data, for one or more companies. Data can be imported to the system from other systems 10 or exported from the system to such other systems.

In an embodiment of the present invention, a certain amount of hard disk space is required to install the system software on the user's PC 4, and the space requirement will increase over time as the user 2 creates and analyzes the financials of different companies. Due to the relatively complex nature of the system software, a Pentium PC with 16 MB of memory is the minimum requirement. For optimum performance, a mid-range Pentium PC with at least 24

MB of memory is recommended. However, the system software will function on any PC running, for example, Windows 3.1, Windows NT, or Windows 95 operating systems. A PC monitor 6 capable of displaying, for example, 800×600 SVGA resolution or higher is also recommended.

In an embodiment of the present invention, in order for the user 2 to install the system software on the user's PC 4, the user chooses, for example, a particular disk version of the system software, depending on the operating system in use on the user's PC. In order to install the system software, the user 2 inserts the appropriate disk version of the system software in the user's PC 4. When the appropriate disk is inserted, the user 2 follows a simple on-screen installation instruction procedure to install the system software on the user's PC 4. The application software is designed to be easy and intuitive to use. The software consists, for example, six standard report templates that reflect the methodology of highlighting the operating profitability and cash flow-generating ability of a company's operations, of which three of the standard report templates facilitate data entry.

Figure 2:
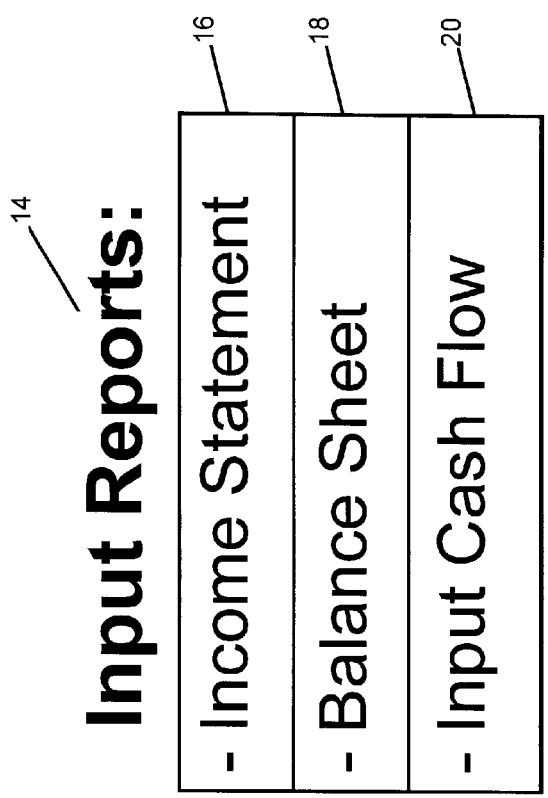
FIG. 2 is a table which illustrates sample Input Reports which facilitate entry of data by the user for an embodiment of the present invention.
Figure 3:
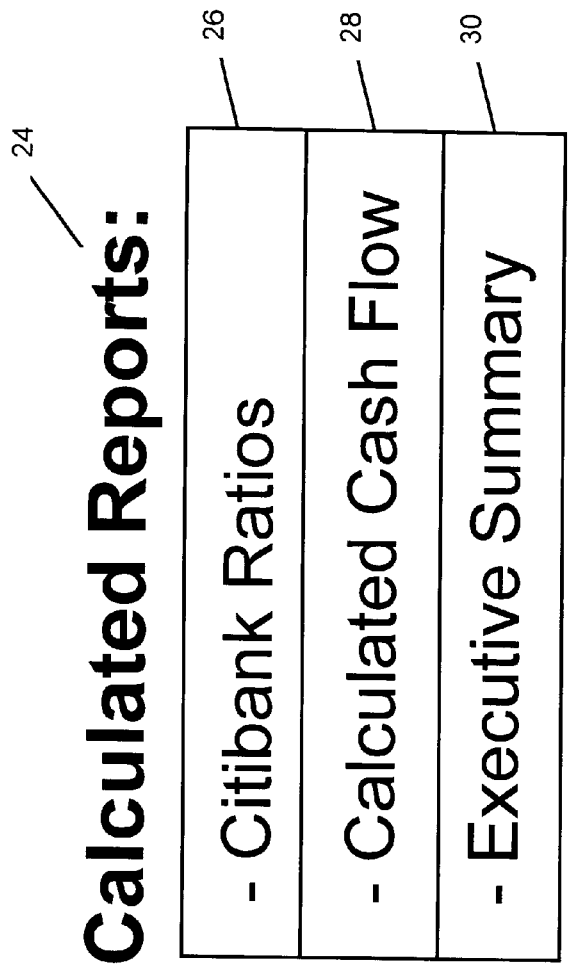
FIG. 3 is a table which illustrates sample Calculated Reports for an embodiment of the present invention.

FIG. 2 is a table which illustrates sample Input Reports 14 which facilitate entry of data by the user 2 for an embodiment of the present invention. The Input Reports 14 include, for example, Income Statement 16, Balance Sheet 18, and Input Cash Flow 20. The system software also includes other standard report templates which are Calculated Reports. FIG. 3 is a table which illustrates sample Calculated Reports 24 for an embodiment of the present invention. The Calculated Reports 24 include, for example, Citibank Ratios 26, Calculated Cash Flow 28, and Executive Summary 30. In addition to the six standard reports, the user 2 can create a custom report in order to add other data/ratios outside the six standard reports. An important aspect of the present invention is the graphical user interface (GUI) that works in conjunction with the system software to prompt the user 2 to input data and to provide the user with spreads and forecasts which enables the user to assess the operating profitability and cash flow-generating ability of a particular company.

Figure 4:
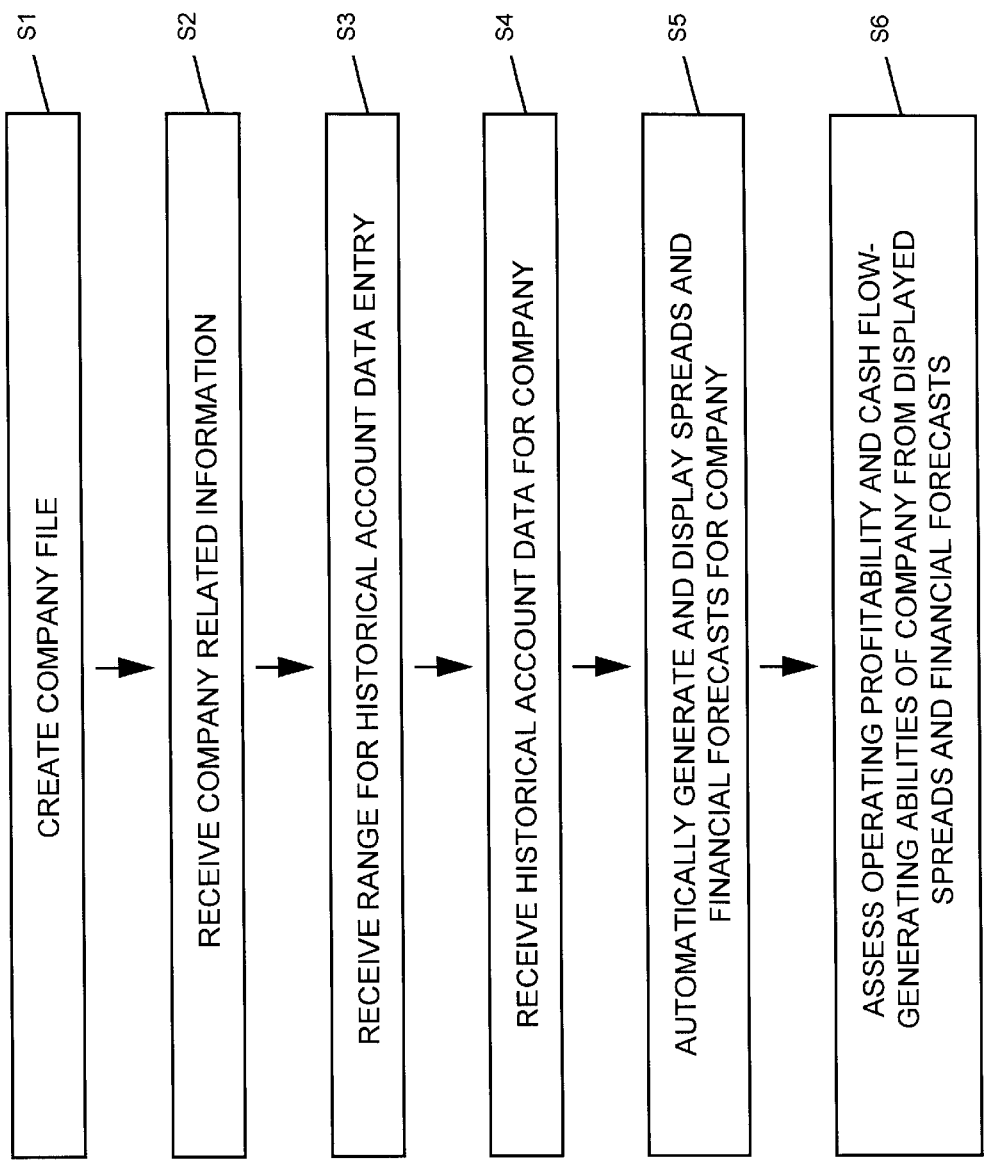
FIG. 4 is a flow chart which illustrates an example of the process of generating spreads and forecasts for an embodiment of the present invention.

In an embodiment of the present invention, the user 2 creates a company file and inputs company related information and historical account data into the system. The system software automatically generates and displays spreads and forecasts, which enable the user 2 to assess the operating profitability and cash flow-generating ability of the company. FIG. 4 is a flow chart which illustrates the process of generating the spreads and forecasts that highlight the operating profitability and cash flow-generating ability of a company for an embodiment of the present invention. The description of the process is intended to illustrate a possible range of steps in the process and is not intended to reflect all aspects of the present invention or to limit the invention to the steps presented.

Referring to FIG. 4, for example, at S1, the system software allows the user 2 to create and prepare a new company file. At S2 the system software prompts the user 2 to enter company-related information, such as a Company ID which identifies the file. At S3, the system software allows the user 2 to specify, for example, the range for historical account data entry. At S4, the system software allows the user 2 to input historical account data for the company into one or more of the three Input Reports 14. The user 2 gathers the company related information and historical data, for example, manually or by importing data from one or more other financial institution systems 10 over network 12. At S5, the system software automatically generates spreads and forecasts for the company, based in part on the historical account data and in part on pre-selected forecast parameters and assumptions. The system displays the spreads and forecasts on the user's PC monitor 6. At S6, the user 2 assesses the operating profitability and cash flow-generating ability of the company highlighted by the displayed spreads and forecasts.

In an embodiment of the present invention, once a company file is created, spreads and forecasts are generated quickly and easily by the system software. All reports are shown, for example, in the currency input by the user 2, as another currency using an exchange rate input by the user, or adjusted for inflation using an inflation rate input by the user. The user 2 can customize the number of accounts to display within Input Reports 14, for example, by a "switch-on" of additional accounts as needed. The user 2 can create the custom report to include, for example, duplicate items from any of the fixed reports, together with custom calculations and ratios. The user 2 can use the custom report, for example, for specialized industry analysis or regional specific requirements, while maintaining the system framework in the standard reports. Comprehensive forecasting options allow the user 2 to forecast each account using a variety of methods, and a number of different forecast scenarios can be created for any single file. For example, inflation accounting options can be defined at an account level, with any resulting surplus or gain reported on an Income Statement 16 or a Balance Sheet 18.

In an embodiment of the present invention, comprehensive account definition information is displayed on the user's PC monitor 6 at all times as the user 2 moves around the various reports, indicating the account reference, description and definition. FIGS. 5–14 are tables which illustrate samples of Report Formulae 33 for an embodiment of the present invention. The Report Formulae 33 include, for example, Income Statement 16 (FIG. 5), Balance Sheet 18 (FIG. 6), Input Cash Flow 20 (FIG. 7), Calculated Cash Flow 28 (FIG. 8), Ratios 26 (FIGS. 9–13), and Executive Summary 30 (FIG. 14). The methodology of the system highlights the operating profitability and cash flow-generating ability of an entity's operations. When and income or expense is identifiable as not directly part of operations, such as financial income; a discontinued operation, such as income from discontinued operations; or a non-recurring event, such as restructuring costs, it is excluded from operating earnings before income tax. Such items appear in a detailed form in the non-operating section of the Income Statement 16, and generally fall under the classification of non-operating items in the Executive Summary 30 and Cash Flow 20 reports.

In an embodiment of the present invention, the format of the Balance Sheet 18 is consistent with the system approach to cash flows and separately spreads assets and liabilities related to core operations from captive finance companies, insurance subsidiaries, and other financial activities. It is important to distinguish between cash needed for operating liquidity and cash and other financial investments that are not related to operations. Cash and other equivalents typically represent a source of current liquidity, while financial investments represent a strategic and voluntary decision to hold an investment portfolio rather than reduce liabilities or invest in plant and equipment. Since companies generally do not treat financial investments as a general source of liquidity, the system treats changes in the balances as voluntary investment decisions, rather than changes in residual cash.

In an embodiment of the present invention, the Calculated Cash Flow Statement 28 is calculated entirely by the system software program without the necessity of inputting variables into the system. It is an indirect method of deriving an entity's cash flow, which is also the focus of evaluating the entity's ability to repay its current and projected debt obligations. Therefore, it is, for example, an important tool to aid in a lending decision. The decision on which method of cash flow to use depends largely on the accounting information available to the user 2. If the only source of information available is a balance sheet and income statement, with no notes or auxiliary information, the Calculated Cash Flow 28 is an obvious choice. A goal of the Calculated Cash Flow Statement 28 is, for example, to highlight the cash effects of changes in various asset or liability categories over time.

In an embodiment of the present invention, the system includes a variety of Ratios 26 that can be used, for example, to judge an entity's individual progress or its performance against its peers. These Ratios 26 are calculated from information in the Income Statement 16, Balance Sheet 18, and Cash Flow Statement 28. The Ratios 26 include, for example, Liquidity Ratios 21, Activity Ratios 23, Performance/Activity Ratios 25, Key Operating Ratios 27, Key Financial Ratios 29, and Historical Trend Analysis 31. Additional Ratios 35 include, for example, an Additional Ratio Analysis and Specialized Industry Ratios. The information on the Executive Summary Report 30 is, for example, largely the summation of analysis from other system reports. A purpose of the Executive Summary Report 30 is, for example, to provide a snapshot of the key performance criteria for an entity.

In an embodiment of the present invention, the graphical user interface or GUI of the system provides the user 2 a clear ongoing explanation of the system processes. The drawings include tables and screens which illustrate examples of menus, selections, options, data entries, functions and the like displayed on screens for the graphical user interface of the system for an embodiment of the present invention. The GUI screens represented by the sample tables are tailored to a specific financial institution, Citibank, but are not intended to limit or restrict the method and system of the present invention. The sample tables which represent the GUI screens of the system are intended to provide representative examples of input and operation information relevant, for example, to creating and preparing company files and generating spreads and forecasts for an embodiment of the present invention. They are not intended to comprehensively describe all possible inputs and functions of the invention.

Figure 15:
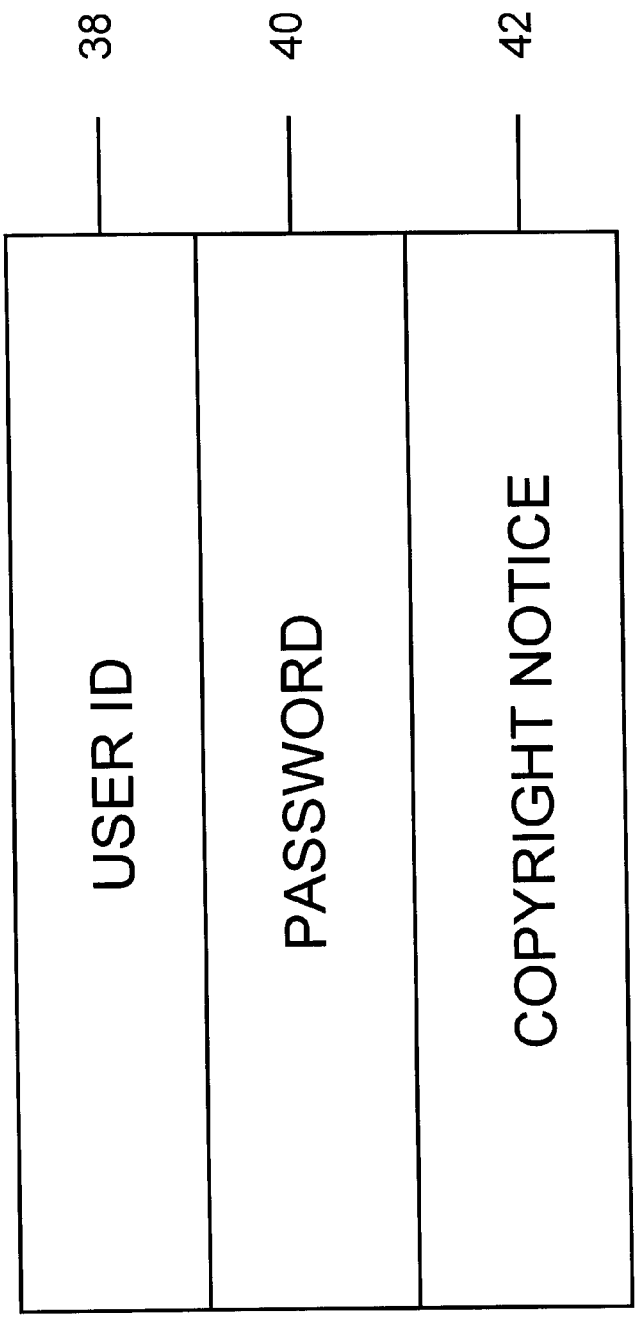
FIG. 15 is a table which shows sample Sign-On menu selections for the graphical user interface for an embodiment of the present invention.

FIG. 15 is a table which shows sample Sign-On menu selections 36 for the graphical user interface for an embodiment of the present invention. Because of the sensitive nature of data that is stored in the system by the user 2, the system prompts and requires the user 2 to enter a valid User ID 38 and Password 40. The system is started by the user 2 entering the user's User ID 38 and Password 40 and agreeing to a Copyright Notice 42. After inputting a valid User ID 38 and Password 40 and before agreeing to the Copyright Notice 42, the user 2 can add new users. Files created within the system are restricted to the users who created them. The user 2 can, after entering a valid User ID 38, change the user's existing Password 40 by clicking a button for a Change Password selection displayed on the screen. Authorization to create a new user is restricted to a system administrator. The Password 40 for the user 2 who forgets the user's Password can be reset, for example, by the system administrator. A new user is created by clicking on a button for a New User selection displayed on the screen, entering a new User ID, and optionally entering an new user description. The new user may be authorized to create other new users by ticking a tick box for an Authority to Create New Users selection displayed on the screen.

Figure 16:
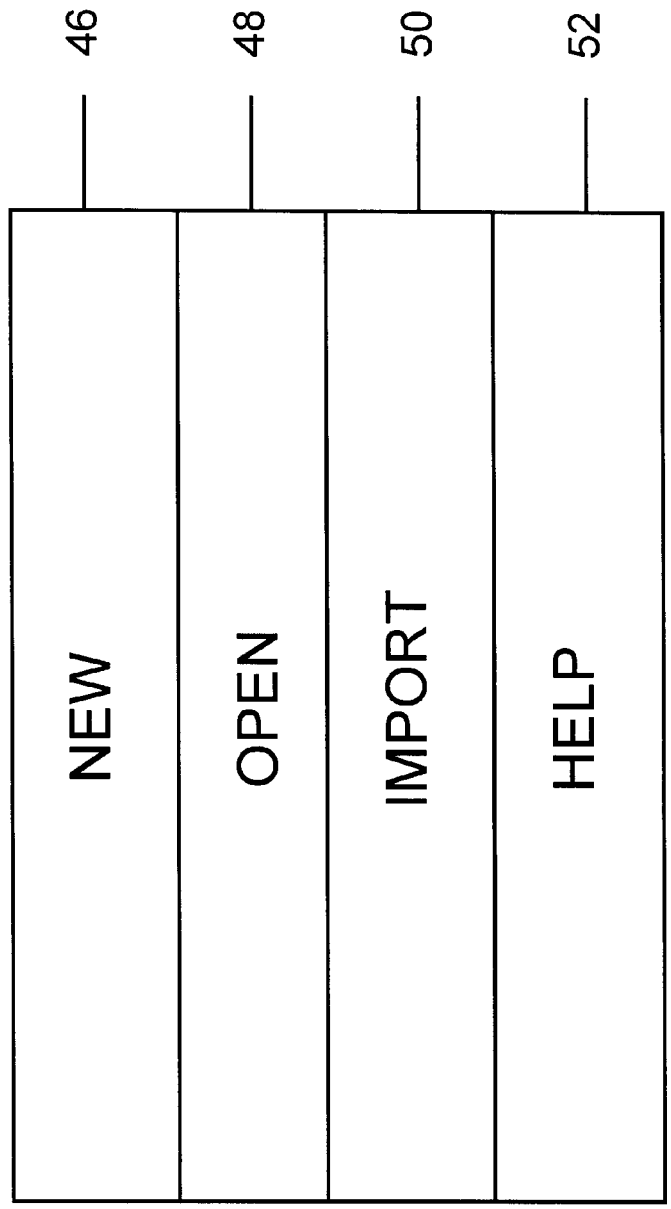
FIG. 16 is a table which shows sample Welcome Menu selections for the graphical user interface for an embodiment of the present invention.

In an embodiment of the present invention, after the user 2 successfully logs on, the system automatically displays a screen with Welcome Menu selections 44. FIG. 16 is a table of sample Welcome Menu selections 44 for the graphical user interface for an embodiment of the present invention. Using the Welcome Menu 44, the user 2 can, for example, create a new file, open an existing file, import data, and access help. The user 2 can access on-line help by selecting the Help function 52 from the Welcome Menu 44, or by clicking on a button for the Help function from the main menu or by pressing the F1 key on the keyboard of the user's PC 4. Company files can be created, saved and deleted. In order to create a new company file, the user selects, for example, New 46 from the Welcome Menu 44 or selects the New function from the main menu. In order to import data, the user 2 selects, for example, the Import function 50 from the Welcome Menu 44.

In an embodiment of the present invention, the user 2 can open or delete existing files and sort files that were previously created or that are available to the user by either a Company ID or a Short Company Name, in ascending or descending order. In order to open an existing file, the user 2 selects, for example, the Open function 48 from the Welcome Menu 44 or the Open function from the main menu. In order to select a company for opening, the user 2 clicks on the particular company. If many files have been created, the user 2 can sort the files by Company ID or Short Company Name. In order to delete an existing file, the user 2 selects the Open function 48. In order to select the company, the user 2 clicks on the particular company. To delete the company, the user 2 selects a Delete button to permanently delete the selected file. Saving the current version of a company file is a way to create a copy of the current file. In order to do so, the user 2 must enter a new Company ID for the file. To make a copy of the file, the user 2 selects Save As from the main menu and enters an alternative Company ID for the file, and the user may also enter an alternative Short Company Name. In order to save the new copy, the user 2 clicks on the Save button on the main menu.

In an embodiment of the present invention, file ownership can be changed by selecting a new owner for the file. By changing file ownership, the user 2 effectively entrusts the file to a new user, who will in turn have to change the ownership back to the user 2 for future file access by user 2. In order to change file ownership, the user selects the Open function 48, selects the company for which the file is to be transferred to a new user, and clicks on a Share File selection button. From a New Owner pull-down menu automatically displayed by the system, the user then selects the User ID 38 and clicks on an Apply button to make the changes effective.

In an embodiment of the present invention, the user 2 can save a file as a template if, for example, the user has created sub accounts for one or more main accounts. If the user 2 wishes to use the structure of the current file as a template for another file, the user can save the currently open file as a template and make it the default. When the user 2 creates the template, the user has the option of making it a new default template, so that when new files are thereafter created, they will adopt the same structure as the template. By including any data also present in the source file, the user 2 can also preserve forecasting options. The user 2 can always revert to the standard system template by selecting Options from an Options Menu of the system and selecting the default template. In order to save a file as a template, the user 2 selects Save As Template from the File menu of the system. When the user 2 creates a custom template, the newly created template also includes any data also present in the source file. Therefore, the user 2 bases the creation of regional or industry specific templates on a file without data.

Figure 17:
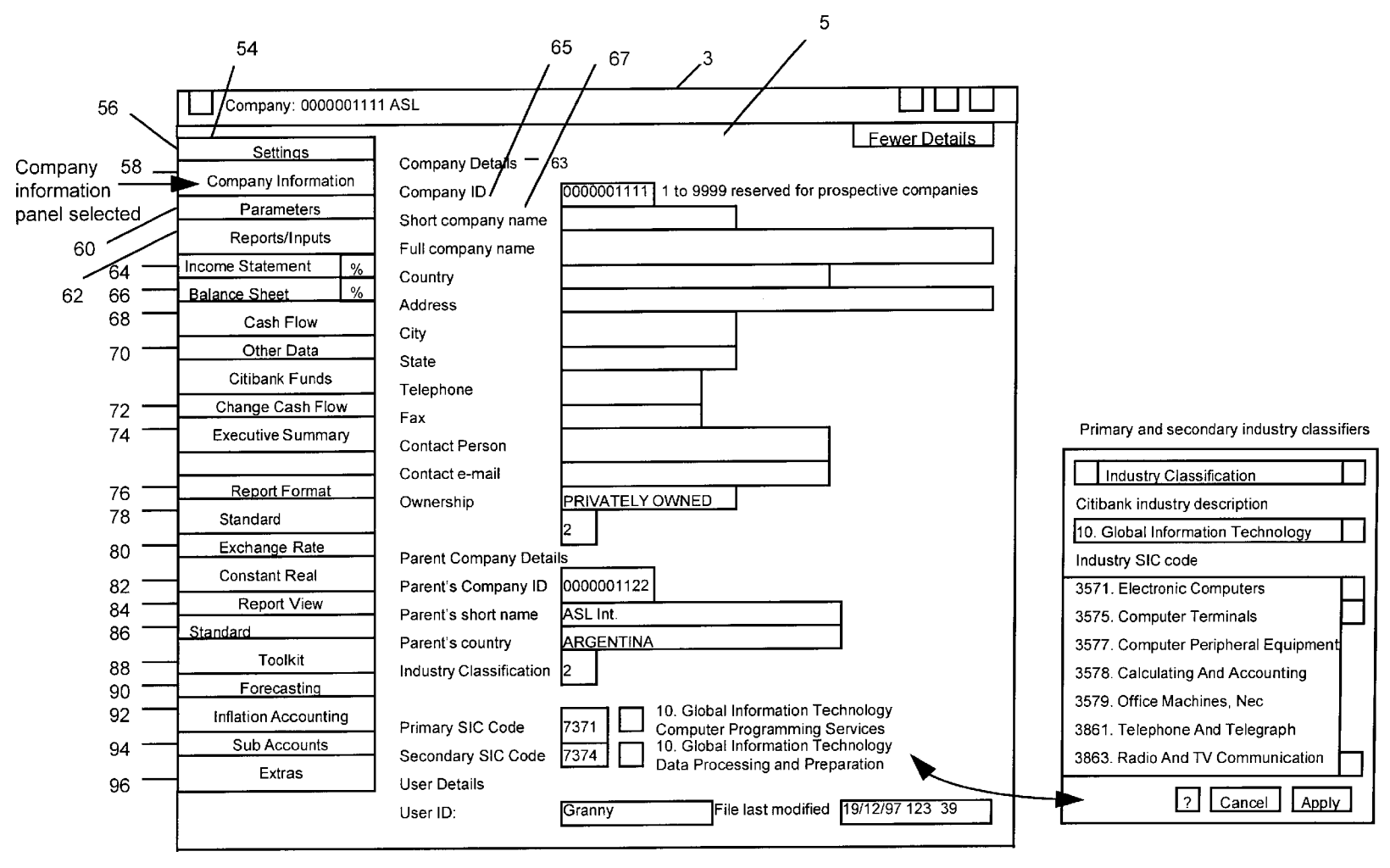

In an embodiment of the present invention, once a company is created or opened, the system automatically displays a Company Window with a Company Menu. When a company file is created, it appears within the Company Window. FIG. 17 shows a sample Company Window with the Company Menu 54 for an embodiment of the present invention. The Company Window 3 is a key element of the system, and the Company Menu 54 displayed with the Company Window 3 provides access to the many options that can be performed by the system for the user 2 when working with a company. The order of buttons and pull-down menus on the Company Menu 54 is in line with a typical user 2 process when creating a company file, for example, from entering Company Information 58 to Inflation Accounting 92. The user 2 selects the Company Information 58 button from the Company Menu 54 to display a Company Information panel 5 with Company Details 63 selections. The system concisely captures a wide range of Company Details 63 on the Company Information panel 5. The only mandatory entry on the Company Information panel 5 is the Company ID 65 and Last Historic Year. If a file already exists with the same Company ID 65 and Last Historic Year, the system prompts the user 2 for an alternative. In order to edit Company Information, the user clicks on the Company Information 58 button, enters a Company ID 65 to identify the file, and sets the Last Historic Year for the file. The user 2 may also input a Short Company Name 67, as well as other optional information for the company.

In an embodiment of the present invention, the Last Historic Year of a file is an important characteristic, as it is linked to a Company ID 65 in order to identify the current version of the file. When the user 2 changes the Last Historic Year of a file, it can affect the historical data in reports, such as changing the year column headings or moving the report data in line with the change. When the Last Historic Year of an existing company file is changed, the system automatically creates a copy of the file, thus making comparisons possible. For a new file that is not yet saved, changing the Last Historic Year simply sets the last year column for historical data input. For an existing file, changing the Last Historic Year can affect any data within the current file. For example, the user 2 can click on a Yes selection to rebase and move data in line with the new setting, or the user can click on a No selection to simply change the year label for the last historic date column, or the user can click on a Cancel selection to exit. In order to save a currently open file, the user 2 clicks on a Save selection from the File menu or Toolbar.

Figure 18:
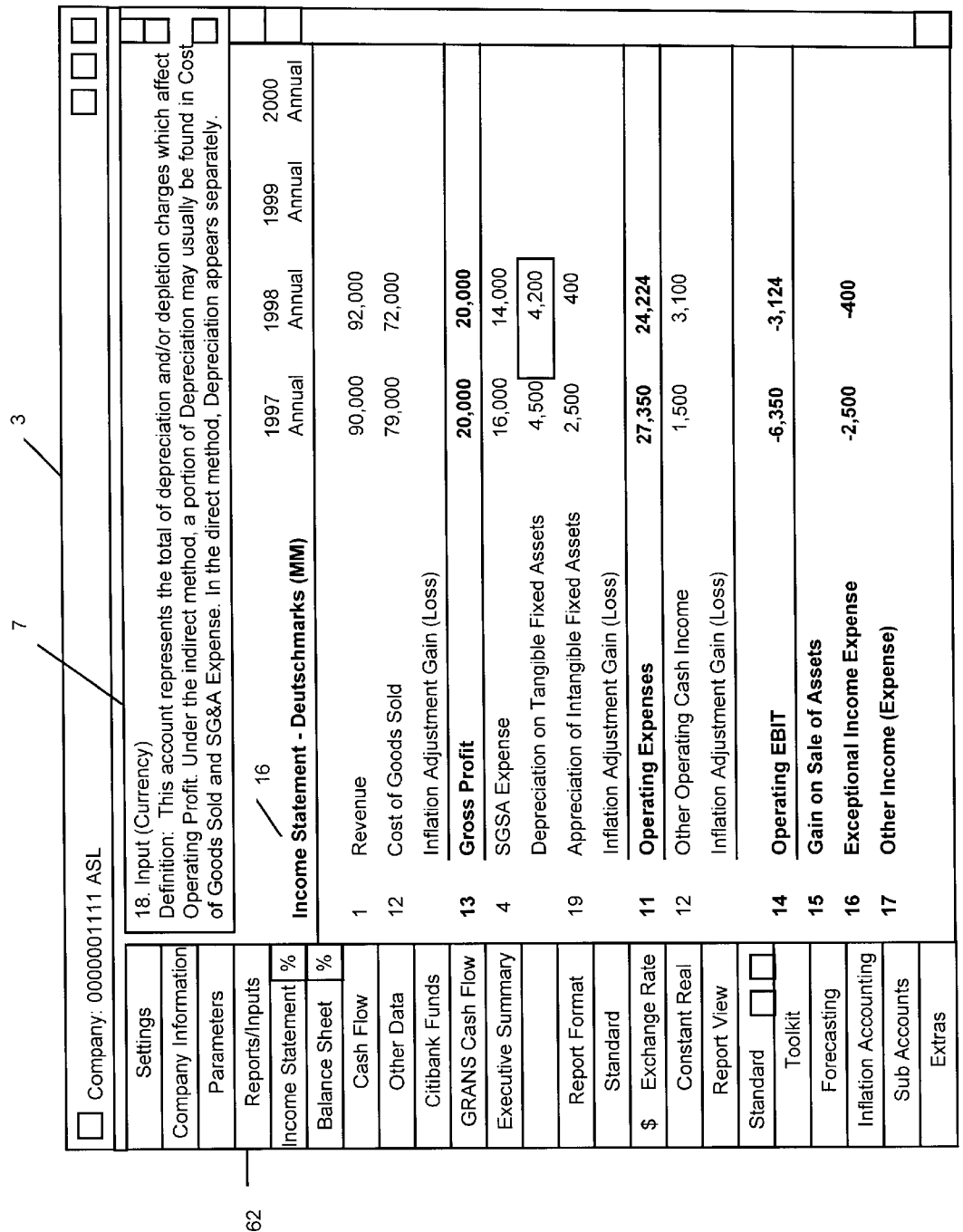
FIG. 18 shows a sample Company Window which illustrates entry of historical account data on the Income Statement for an embodiment of the present invention.

In an embodiment of the present invention, a degree of historical account data must be entered by the user 2 in order to produce spreads and forecasts. FIG. 18 is a sample Company Window 3 which illustrates historical account data on the Income Statement 16 for an embodiment of the present invention. A typical process involves entry by the user 2 of historical account data for the company into the three Input Reports 14, namely Income Statement 16, Balance Sheet 18, and Input Cash Flow 20. From data entered into the three Input Reports 14, additional reports are calculated by the system, such as Calculated Cash Flow 28, Ratios 26, and Executive Summary 30. In order to select different reports, the user 2 clicks on the Report selection 62 from the Company Menu 54. As the user 2 navigates around the standard system reports, comprehensive account information is provided in a Definitions window 7 displayed by the system. This information covers, for example, account reference and account description, account type (currency, percent, ratio, count or price), and includes, for example, Report Formulae 33 and Account Definition 19. Definitions are automatically updated as the user 2 moves around reports. In order to resize or hide the Definitions window 7, the user 2 clicks on the Toolkit Extras 96 selection from the Company Menu 54 and clicks on an Increase Height icon, a Decrease Height icon or a Show/Hide icon automatically displayed by the system.

Figure 19:
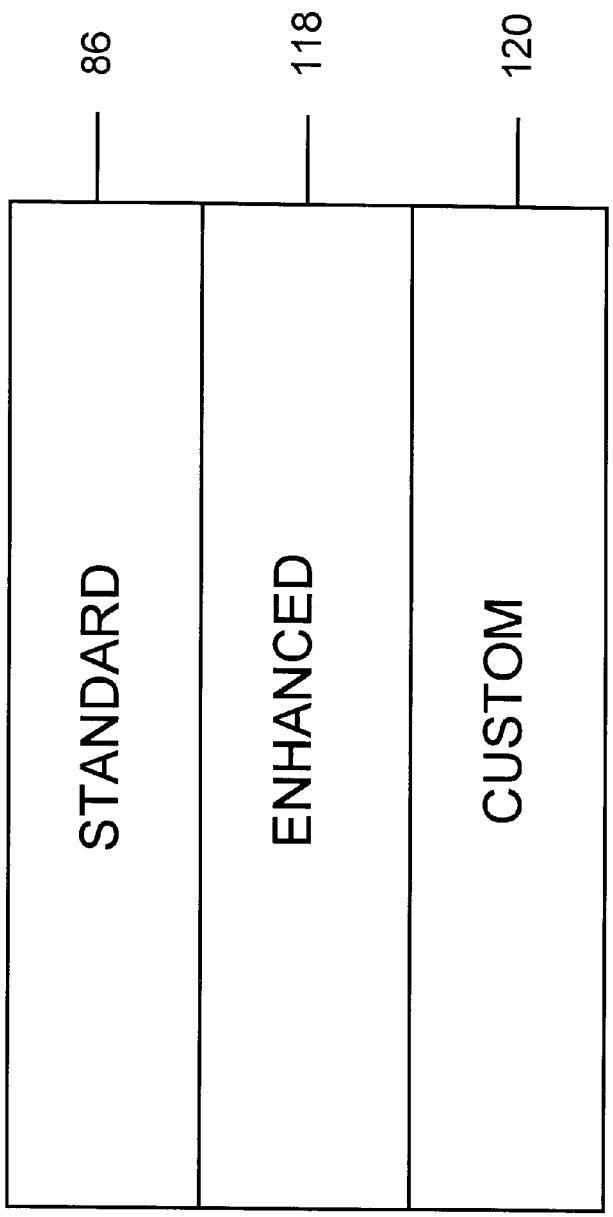
FIG. 19 shows sample Report View selections for the graphical user interface for an embodiment of the present invention.

In an embodiment of the present invention, there are, for example, three ways in which company reports can be viewed by the user 2 clicking on the Report View selection 84 from the Company Menu 54. FIG. 19 is a table which shows samples of Report View 84 selections for an embodiment of the present invention. For example, the user 2 can switch the level of detail shown in reports between Standard 86, Enhanced 118, and Custom 120 views. The Standard view 86 shows a reduced number of accounts in the Income Statement 16 and Balance Sheet 18 accounts, whereas the Enhanced view 118 shows all accounts. By clicking on an Edit Custom View button, individual account rows can be hidden or displayed to individual company file requirements. In order to switch report views, the user 2 clicks on a button for the Standard 86 selection to show a reduced number of accounts on the Income Statement 16 and Balance Sheet 18. In order to show all accounts on the Income Statement 16 and Balance Sheet 18, the user 2 clicks on a button for the Enhanced 118 selection. In order to show only accounts which the user 2 specifies, the user clicks on a button for the Custom view selection 120, and the user can define the user's Custom view by clicking on the Edit Custom View when in the Custom view selection 120. The user 2 can customize the report view by clicking on the button for the Custom view selection 120, clicking the Edit Custom View button, clicking a Hide icon to hide the account, and clicking the Edit Custom View button again to apply the changes.

In an embodiment of the present invention, if a system Input Account 14 does not provide the required level of breakdown, the user 2 can create sub accounts to the main account in order to do so. The Input Account 14 then becomes a calculation, summing the related sub accounts. The user 2 can define sub accounts for any Input Account 14. Creation of sub accounts caters for regional variations while ensuring consistency with top-level methodology of the system. Sub account descriptions can be entered, but sub account references cannot be entered, in order to maintain the account integrity of the system. The user 2 can create sub accounts using an Add/Delete sub accounts button from Sub Accounts 94 of the Toolkit 88 selection of the Company Menu 54. The user 2 creates sub accounts by clicking on any Input Account 14 row, ensuring that the Report Format 76 setting is Input Currency, clicking on the button for the Toolkit Sub Account 94 selection, and adding the sub account by clicking on an Add sub account button. Sub accounts can be deleted by the user 2 clicking on any already added sub account row, ensuring that the Report Format 76 setting is Input Currency, and deleting the sub account by clicking on a Delete sub account button.

In an embodiment of the present invention, each of the reports within the system can be formatted by the user 2 in different ways using a button for the Report Format 76 selection from the Company Menu 54. FIG. 20 is a table which shows examples of Report Format Currency 76 selections for an embodiment of the present invention. Year Level Variables are used in conjunction with changing the Report Format 76, and the necessary exchange and inflation rates are entered in the Year Level Variables section. Data can be shown as Input Currency 109 (data entry currency), Exchange Currency 111 (using the exchange rate in the Year Level Variables section), U.S. Dollars 113 (using the U.S. Dollar rate entered in the Year Level Variables section), or Nominal or Real 115 (using rates entered in the Year Level Variables section).

In an embodiment of the present invention, each company file can store, for example, up to five years of historic account information and can produce forecasts, for example, of up to ten years. This can be set along with other year related information in the Model Parameters panel. Input into the Year Level Variables section is necessary, for example, if reports need to be calculated as another currency or with any inflation accounting adjustments. FIG. 21 is a table which shows sample Year Level Variables report 98 selections for an embodiment of the present invention. In addition, for information purposes, Statement date 100 and Accounting Status 102 can also be entered. In order to access the Model Parameters panel, the user 2 clicks the button for the Parameters selection 60 from the Company Menu 54. The Year Level Variables report 98 is shown that is used in conjunction with the Report Format 76 when viewing data in different terms.

In an embodiment of the present invention, the user 2 can display forecast data, manage the Forecast Assumptions, including domestic inflation in forecasts. Input Accounts 14 can be forecast forward, for example, from one to ten years with, for example, fifteen forecast methodologies. The display of results and assumptions is controlled by the Toolbar 88 menu. Five scenarios can be selected from the Toolbar 88 menu. Changing the scenario updates and recalculates forecasts for every Input Account 14 in a company file. From the Toolkit 88 menu, the user 2 clicks on the button for the Forecasting selection 90 to automatically display a Forecasting panel with appropriate options as the user 2 selects top level controls. FIG. 22 is a sample Forecasting panel 55 for an embodiment of the present invention. Inflation can be added to forecast assumptions to enable more accurate forecasting and to be used in conjunction with inflation adjustment functionality. The inflation forecast calculations use real numbers within the formula to prevent accounting for inflation twice.

Figure 24:
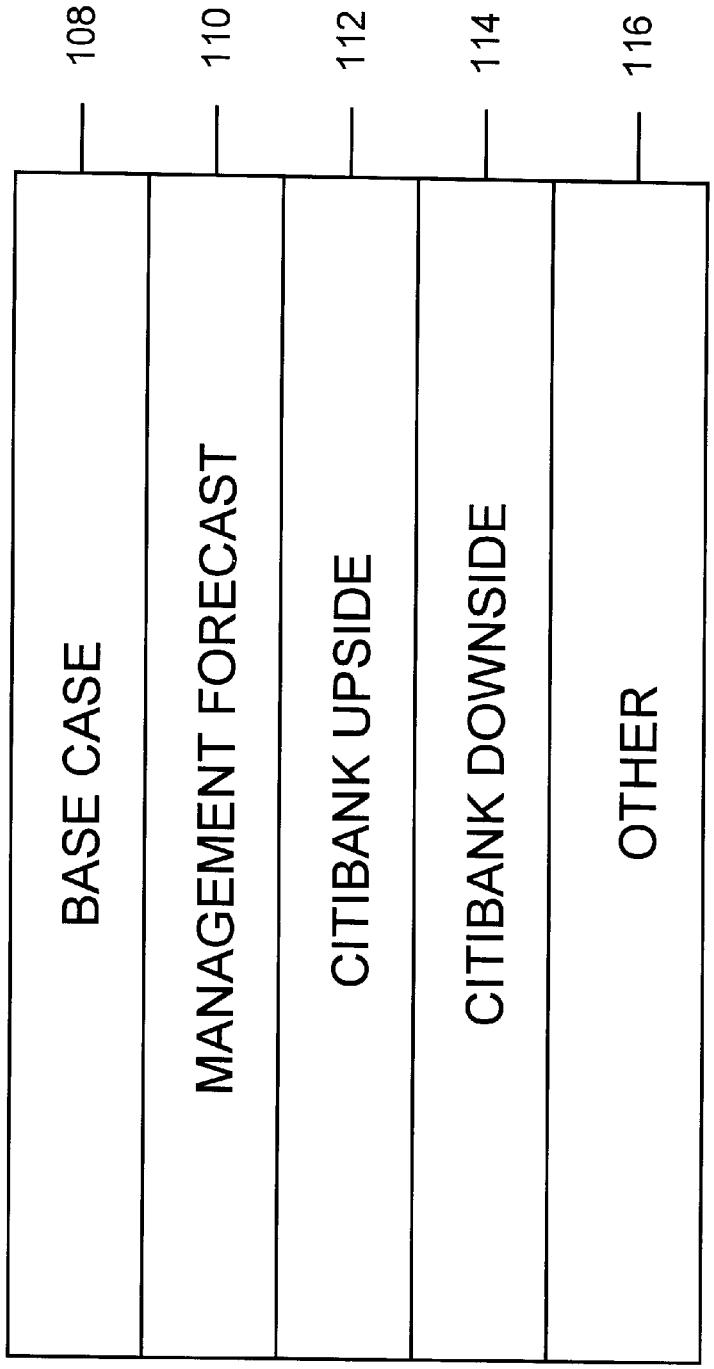
FIG. 24 is a table which shows sample Current Scenario Options for the graphical user interface for an embodiment of the present invention.

FIG. 23 is a table which shows sample Forecast Assumptions 93 for an embodiment of the present invention. The user 2 sets account level forecasting preferences for any Input Account 14 by clicking the button for the Forecasting selection 90 from the Toolkit 88 menu to enable the Forecasting panel 55. An Apply button 57 on the Forecasting panel 55 enables the user 2 to apply the forecast to the model. A Forecast Assumption data button 59 on the Forecasting panel 55 enables the user 2 to view the Forecast Assumption data. A Forecast Results button 61 on the Forecasting panel 55 enables the user 2 to view the forecast results. The Forecasting selection 90 from the Toolkit selection 88 also allows the user 2 to define the account level forecasts. The Forecasting panel 55 also gives the user 2 a number of Current Scenario Options. FIG. 24 is a table which shows sample Current Scenario Options 106 for an embodiment of the present invention.

In an embodiment of the present invention, using the Forecasting panel 55, the user 2 has the option of forecasting all accounts in the current report, forecasting individual accounts in the current report, or editing inflation preferences in the current report. The user 2 can input the user's own Forecast Assumptions 93, such as Value 95, Growth Rate 97, Multiple 99, Percent 101, Percent of Previous Year 103, or None 105. The user 2 can also populate the growth rate assumptions with Auto Input Figures for Growth Rate Assumptions 118. FIG. 25 is a table which shows sample Auto Input FIGS. 118 for an embodiment of the present invention. FIG. 26 is a table which shows sample Calculated Forecast Assumptions and FIGS. 117 for an embodiment of the present invention. Calculated Forecast Assumptions and FIGS. 117 of the system include, for example, Growth Rate of Previous Year 119, Average Growth Rate of Historic Years 121, Compound Annual Growth Rate of Historic Years 123, Moving Average Growth Rate of 3–5 Years 123, and Moving Compound Annual growth Rate of 3–5 Years 125. Other options available to the user 2 on the Forecasting panel 55 include, for example, Base Forecast Assumptions on Another Account and Use Assumption Data from Another Account.

Figure 27:
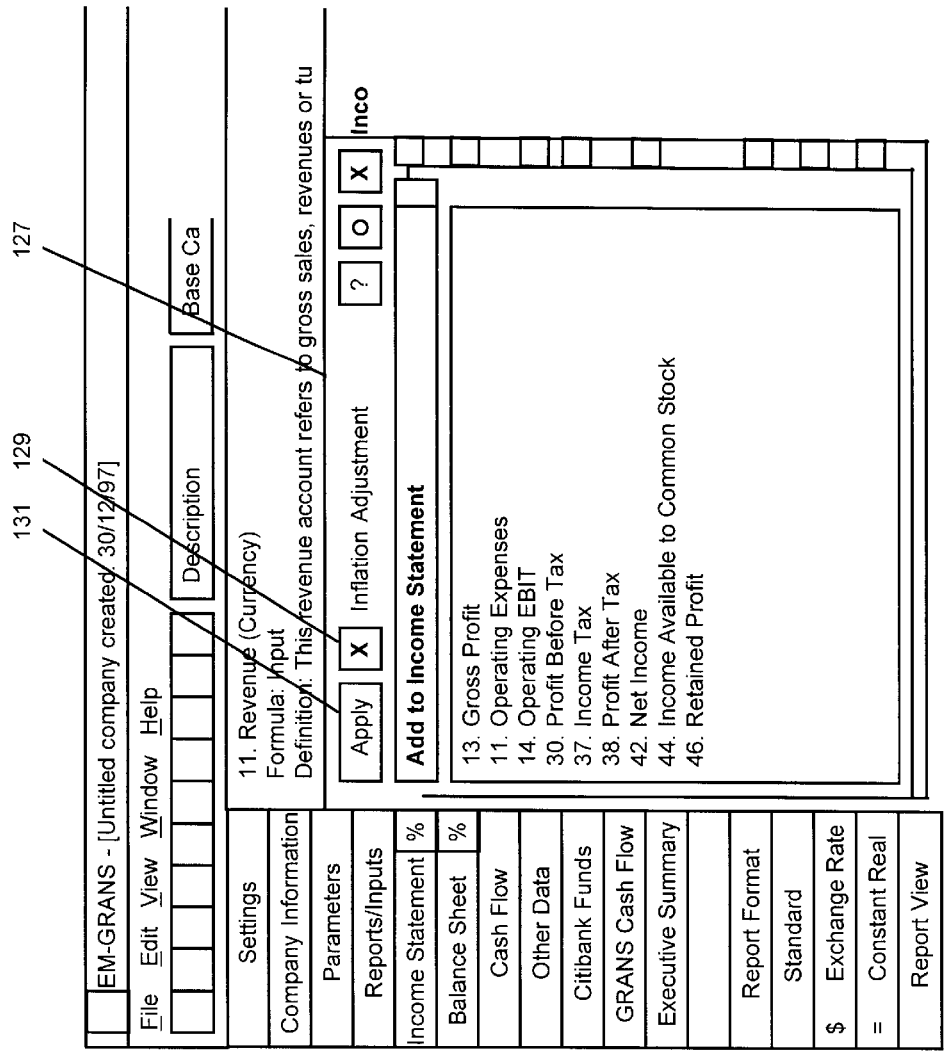
FIG. 27 shows a sample Inflation Adjustment panel for an embodiment of the present invention.

In an embodiment of the present invention, an Inflation Adjustment panel operates in a similar automatic manner as the Forecast panel. FIG. 27 shows a sample Inflation Adjustment panel 127 for an embodiment of the present invention. The user 2 defines which accounts should have inflation removed, and then specifies where in the system template any resulting adjustments are to be reported. The inflation adjustment functionality affects only forecast results and not historical data. If any country specific inflation accounting functionality is required, Custom Reports can be utilized to build the desired methodology. The resulting file can then be saved and distributed as a system template. In order to display the Inflation Adjustment panel 127, the user 2 clicks on the button for the Inflation Accounting selection 92 from the Company Menu 54. The user 2 clicks on an Inflation Adjustment button 129 on the Inflation Adjustment panel 127 to turn it on. The user 2 then selects which forecasts should have inflation removed for the results to be totaled elsewhere.

In an embodiment of the present invention, using the Inflation Adjustment panel 127, the user 2 defines which accounts are to be adjusted for inflation, specifying where resulting surplus or gain is to be reported, if at all. The user 2 chooses where to add the Inflation Adjustment results, such as any total field in either the Income Statement 16 or the Balance Sheet 18 split into assets and liabilities. The user 2 chooses where to add results by selecting, for example, either Income Statement 16 or Balance Sheet 18 and choosing where results should be added to the system template. Inflation Adjustment can be added to an Income Statement 16 report total calculation. Adjustment gains/losses can be split between assets and liabilities total calculation in the Balance Sheet report 18. The Balance Sheet report 18 has the additional option of either splitting the results as defined or dividing the total by two. The user 2 uses an Apply button 131 on the Inflation Adjustment panel 127 to apply Inflation Adjustment preferences to the model and the On/Off button 129 to turn Inflation Adjustment on or off. An Option bar on the Inflation panel prompts the user 2 for entry of a choice, for example, of where to add Inflation Adjustment.

In an embodiment of the present invention, the Toolkit selection 88 contains functions to utilize available screen space such as a zoom function and the ability to enable or disable the Definitions window or account notes column. In order to access the Toolkit Extras, the user 2 clicks on the button for the Toolkit Extras selection 96 to enable a Toolkit Extras menu. Using the Toolkit Extras menu, the user 2 can select a number of functions by clicking on various icons, such as enabling or disabling column sizing, showing or hiding the account notes column, hiding or showing the Definitions window, or decreasing the height of the Definitions window. The user 2 can also click on one of the Toolkit Extras menu selections to reset the report zoom level to 100 percent increase or decrease the view percent of reports. Individual account notes can be entered at any time by enabling the account notes column from the Toolkit menu. Account notes can be added for all accounts, both input and calculated. The user 2 can edit account notes by clicking on the button for the Toolkit Extras selection 96. In order to enable the account notes column, the user 2 clicks on a button for a Show/Hide account notes, and in order to disable the account notes column, the user 2 clicks on the Show/Hide account notes button once again. The format for printed reports can be set by using Page Setup and Print Setup options selected from the main menu when a file is opened. Multiple reports can be printed by making selections using a Print Wizard.

In an embodiment of the present invention, the user 2 can create a custom report that may include duplicate items from any of the other reports, together with custom calculations and ratios. The custom report can be used, for example, for specialized industry analysis or regional specific requirements while maintaining the system framework in the nine standard reports. In order to create the custom report, the user 2 creates a new company file or opens an existing one and clicks on a button for the custom report selection. In addition to the standard system reports, the user 2 can create a custom report that includes, for example, copies of the standard system accounts, together with regional/company specific data and ratios. The custom report is adapted to enable the user 2 to create, for example, formulae and format data. In order to build a custom report, the user 2 selects the Custom Report view 120 from the Report View 84 of the Company Menu 54 and adds one or more system accounts, one or more of the user's own formulae, and uses the spreadsheet options and formats the report. The Custom Report selection 120 includes features, such as formatting and printing options, and Microsoft compatible spreadsheet functions. The user 2 formats a custom report by selecting the Custom Report view 120 and using a pop-up menu to switch between different sets of spreadsheet options. The user 2 presses the appropriate button for the user's required function, or alternatively, selects from a wider range of options from the menus.

In an embodiment of the present invention, once some company files have been created, the user 2 can create combined files that represent either an aggregation or average of data from the source files. This feature is useful when the user 2 wishes to create an industry picture by including company files by industry. When the user 2 creates a combined file, certain business rules apply. For example, company files that are combined must have the same Last Historic Year. Further, company files that are combined must have some data for all historic years requested, or that particular company file will be omitted from the combination. This applies only to historical data and not forecast data that may exist in each source file. Also, if forecasts are included in the combined file, the forecast scenario used from each source company file will be the active scenario as of the time the file was last saved. Additionally, if the source files do not share a common Input Currency 109, the combination of data is possible only as U.S. Dollars 113. The user 2 must ensure that a valid U.S. Dollar Exchange Rate 80 exists for every year in each source file which the user wishes to combine. Finally, the Last Historic Year estimate is combined from each source file, and this becomes the Last Historic Year for the final combined file. A Combination Wizard takes the user 2 through the process of creating the combined file in simple steps. Once created, combined files can be opened and saved in the same manner as company files.

In an embodiment of the present invention, once company files or combined files have been created, the user 2 can create comparisons by comparing two files against one another. The resulting report shows only the difference between the two compared files, as either a value or a percentage. Types of possible comparison scenarios include, for example, actual versus forecast of the same company that has two consecutive Last Historic Year versions, or like versus like for a company file versus another company file or combined file that share a common Last Historic Year. When the user 2 compares files, a number of business rules apply. For example, for actual versus forecast comparisons, the two files must be for the same company that has two consecutive Last Historic Year versions. Further, for like versus like comparisons, the two files must have a common Last Historic Year. Additionally, an estimate column from each source file is used for the Last Historic Year comparison. Finally, if the source files do not share a common Input Currency 109, the comparison of data is possible only as U.S. Dollars 113. The user 2 must ensure that a valid U.S. Dollar Exchange Rate 80 exists for every year in each source file that the user wishes to compare, if this is the case. A Comparison Wizard takes the user 2 through the process of creating comparisons in easy steps.

In an embodiment of the present invention, an Import Wizard likewise takes the user 2 through the process of importing files in a number of simple steps. The system imports data, for example, from a number of financial institution systems, such as Citibank systems. The system also includes a customizable import filter that allows the user 2 to import, for example, any Excel file that contains correct row or account. An Export Wizard also takes the user 2 through the process of exporting files in a number of easy steps. The system exports, for example, files covering all six of the standard reports. If a particular file has forecasts defined, the forecast information included is according to the currently active forecast scenario in the file.

In an embodiment of the present invention, a File Options command from the Toolkit 88 of the Company Menu 54 allows the user 2 to access a System Preferences screen. Using the System Preferences screen, the user 2 can specify where the system database is located and what template is currently being used as the default. In order to change the database location, the user 2 user selects the Options button from the Toolkit menu and selects the system database. The user 2 reverts to the default location by clicking a Default button. In order to change the default template, the user selects the Options button from the Toolkit menu and selects an alternative template. The user 2 reverts to the default template by clicking the Default button.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention. Accordingly, the invention is only limited by the following claims.

What is claimed is:

1. A method for performing financial spreading and forecasting for an entity, comprising:
   receiving information about the entity;
   receiving entry of a selection of a forecast assumption for the entity selected from a group of forecast assumptions consisting of an input forecast assumption, a calculated forecast assumption, a forecast assumption based on another account, and a forecast assumption using assumption data for another account;
   receiving historical account data for the entity; and
   automatically generating a financial forecast for the entity based at least in part on the selected forecast assumption and the historical account data, the financial forecast for the entity being selected from a group of forecast scenarios consisting of a base case forecast, a management forecast, an upside forecast, a downside forecast, and an other forecast.

2. The method of claim 1, wherein receiving information further comprises receiving the information by an application program.

3. The method of claim 2, wherein receiving the information further comprises entering the information on the application program.

4. The method of claim 3, wherein entering the information further comprises entering at least one of a company ID which uniquely identifies the entity and a company name of the entity.

5. The method of claim 4, wherein entering the information further comprises entering the information by a user at a computer.

6. The method of claim 5, wherein entering the information by the user further comprises automatically prompting the user to enter the information.

7. The method of claim 1, wherein receiving information further comprises automatically displaying a company information panel.

8. The method of claim 7, wherein receiving the information further comprises entering the information on the company information panel.

9. The method of claim 8, wherein entering the information further comprises entering at least one of a company ID which uniquely identifies the entity and a company name of the entity on the company information panel.

10. The method of claim 9, wherein entering the information further comprises entering the information by a user at a computer.

11. The method of claim 10, wherein entering the information by the user further comprises automatically prompting the user to enter the information.

12. The method of claim 1, further comprising receiving forecast parameters by an application program.

13. The method of claim 12, wherein receiving the forecast parameters further comprises entering the forecast parameters on the application program.

14. The method of claim 13, wherein entering the forecast parameters further comprises entering at least one of last historic year parameters and inflation adjustment parameters.

15. The method of claim 13, wherein entering the forecast parameters further comprises entering the forecast parameters by a user at a computer.

16. The method of claim 1, further comprising automatically displaying a parameters panel for a user.

17. The method of claim 16, wherein displaying the parameters panel further comprises entering forecast parameters on the parameters panel by the user.

18. The method of claim 17, wherein entering the forecast parameters further comprises entering at least one of last historic year parameters and inflation adjustment parameters.

19. The method of claim 18, wherein entering the forecast parameters further comprises entering the forecast parameters by the user at a computer.

20. The method of claim 19, wherein entering the forecast parameters by the user further comprises automatically prompting the user to enter the forecast parameters.

21. The method of claim 1, wherein receiving historical account data further comprises retrieving the data by a computer application.

22. The method of claim 1, wherein receiving the historical account data further comprises gathering the data by a user.

23. The method of claim 1, wherein retrieving the data further comprises retrieving the data from a database.

24. The method of claim 23, wherein retrieving the data from the database further comprises importing the data from the database by a computer application.

25. The method of claim 24, wherein importing the data further comprises importing the data from a computer database by the computer application.

26. The method of claim 25, wherein importing the data further comprises importing the data to an application program.

27. The method of claim 26, wherein importing the data further comprises importing the data over a computer network.

28. The method of claim 1, wherein receiving historical account data further comprises receiving the data by an application program.

29. The method of claim 28, wherein receiving the data further comprises entering the data on the application program.

30. The method of claim 29, wherein entering the data further comprises entering the data on at least one input report of the application program selected from a group consisting of an income statement report, a balance sheet report, and an input cash flow report.

31. The method of claim 29, wherein entering the data further comprises entering the data on a plurality of input reports of the application program selected from a group consisting of an income statement report, a balance sheet report, and an input cash flow report.

32. The method of claim 29, wherein entering the data further comprises entering the data by a user at a computer.

33. The method of claim 32, wherein entering the data by the user further comprises automatically prompting the user to enter the data.

34. The method of claim 1, wherein receiving historical account data further comprises automatically displaying a company window.

35. The method of claim 34, wherein receiving the data further comprises entering the data on the company window.

36. The method of claim 34, wherein displaying the company window further comprises automatically displaying at least one input report selected from a group consisting of an income statement report, a balance sheet report, and an input cash flow report.

37. The method of claim 36, wherein entering the data on the company window further comprises entering the data on the at least one displayed input report.

38. The method of claim 34, wherein displaying the company window further comprises automatically displaying a plurality of input reports selected from a group consisting of an income statement report, a balance sheet report, and an input cash flow report.

39. The method of claim 38, wherein entering the data on the company window further comprises entering the data on the plurality of displayed input reports.

40. The method of claim 1, wherein automatically generating the financial forecast further comprises automatically generating at least one calculated report selected from a group consisting of a calculated cash flow report, a ratios report, and an executive summary report.

41. The method of claim 40, wherein automatically generating the at least one calculated report further comprises automatically displaying the calculated report.

42. The method of claim 1, wherein automatically generating the financial forecast further comprises automatically generating a plurality of calculated reports selected from a group consisting of a calculated cash flow report, a ratios report, and an executive summary report.

43. The method of claim 42, wherein automatically generating the plurality of calculated reports further comprises automatically displaying the plurality of calculated reports.

44. The method of claim 1, wherein automatically generating the financial forecast further comprises automatically generating the financial forecast for a pre-selected number of years.

45. The method of claim 1, wherein automatically generating the financial forecast further comprises automatically forecasting at least one of all accounts in a current report and individual accounts in a current report.

46. The method of claim 45, wherein automatically forecasting further comprises editing inflation preferences in the current report.

47. The method of claim 1, wherein automatically generating the financial forecast further comprises automatically adjusting at least one account for inflation.

48. The method of claim 1, wherein automatically generating the financial forecast further comprises automatically converting a currency.

49. The method of claim 1, wherein automatically generating the financial forecast further comprises automatically displaying the financial forecast for a user.

50. The method of claim 1, further comprising automatically generating a custom report for the entity based at least, in part, on the forecast assumptions and the historical account data.

51. The method of claim 1, further comprising automatically generating a combined file for the entity based at least, in part, on the forecast assumptions and the historical account data.

52. The method of claim 1, further comprising assessing operating profitability and cash flow-generating abilities of the entity according to the financial forecast.

53. The method of claim 52, wherein assessing further comprises assessing the operating profitability and cash flow-generating abilities of the entity by a user.

54. The method of claim 53, wherein assessing the operating profitability and cash flow-generating abilities further comprises assessing the operating profitability and cash flow-generating abilities by the user based on the financial forecast.

55. The method of claim 1, wherein receiving the selection of the input forecast assumption further comprises receiving the selection from a group consisting of value, growth rate, multiple, percent, and percent of previous year.

56. The method of claim 1, wherein receiving the selection of the calculated forecast assumption further comprises receiving the selection from a group consisting of growth rate of previous year, average growth rate of historic years, compound annual growth rate of historic years, moving average growth rate of a predetermined number of years, and moving compound annual growth rate of a predetermined number of years.

57. The method of claim 1, wherein generating the financial forecast further comprises generating the financial forecast for the entity in a currency other than a currency input by a user using an exchange rate input by the user.

58. The method of claim 1, wherein generating the financial forecast further comprises generating the financial forecast for the entity with inflation removed from at least one account.

59. The method of claim 1, wherein generating the financial forecast further comprises generating the financial forecast for the entity with inflation added to a preselected one of an income statement and a balance sheet for at least one account.

60. The method of claim 1, wherein generating the financial forecast further comprises generating the financial forecast for the entity which includes a comparison with a financial forecast generated for a preselected combination of entities.

61. A system for performing financial spreading and forecasting for an entity, comprising:
 means for receiving information about the entity;
 means for receiving entry of a selection of a forecast assumption for the entity selected from a group of forecast assumptions consisting of an input forecast assumption, a calculated forecast assumption, a forecast assumption based on another account, and a forecast assumption using assumption data for another account, the forecast assumption selection receiving means being associated with the information receiving means;
 means for receiving historical account data for the entity, the historical account data receiving means being associated with the forecast parameters receiving means; and
 means for automatically generating a financial forecast for the entity based at least in part on the selected forecast assumption and the historical account data, the financial forecast for the entity being selected from a group of forecast scenarios consisting of a base case forecast, a management forecast, an upside forecast, a downside forecast, and an other forecast.

62. The system of claim 61, wherein the means for receiving the historical account data further comprises means for importing the data.

63. The system of claim 62, wherein the means for importing the data further comprises a database storing the data.

64. The system of claim 63, wherein the means for receiving the historical account data further comprises an application program on a computer coupled to the database.

65. The system of claim 64, wherein the means for receiving the information further comprises the application program on the computer.

66. The system of claim 65, wherein the means for receiving the forecast assumption further comprises the application program on the computer.

67. The system of claim 66, wherein the means for automatically generating further comprises the application program on the computer.

68. The system of claim 61, wherein the means for receiving the selection of the input forecast assumption further comprises means for receiving the selection from a group consisting of value, growth rate, multiple, percent, and percent of previous year.

69. The system of claim 61, wherein the means for receiving the selection of the calculated forecast assumption further comprises means for receiving the selection from a group consisting of growth rate of previous year, average growth rate of historic years, compound annual growth rate of historic years, moving average growth rate of a predetermined number of years, and moving compound annual growth rate of a predetermined number of years.

70. The system of claim 61, wherein the means for generating the financial forecast further comprises means for generating the financial forecast for the entity in a currency other than a currency input by a user using an exchange rate input by the user.

71. The system of claim 61, wherein the means for generating the financial forecast further comprises means for generating the financial forecast for the entity with inflation removed from at least one preselected account.

72. The system of claim 61, wherein the means for generating the financial forecast further comprises means for generating the financial forecast for the entity with inflation added to a preselected one of an income statement and a balance sheet for at least one account.

73. The system of claim 61, wherein the means for generating the financial forecast further comprises means for generating the financial forecast for the entity which includes a comparison with a financial forecast generated for a preselected combination of entities.

* * * * *